United States Patent
Samejima et al.

(10) Patent No.: US 8,305,000 B2
(45) Date of Patent: Nov. 6, 2012

(54) DISCHARGE LAMP LIGHTING APPARATUS

(75) Inventors: Takanori Samejima, Hyogo (JP); Masashi Okamoto, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 273 days.

(21) Appl. No.: 12/805,339

(22) Filed: Jul. 27, 2010

(65) Prior Publication Data

US 2011/0018460 A1  Jan. 27, 2011

(30) Foreign Application Priority Data

Jul. 27, 2009   (JP) .................................. 2009-173957

(51) Int. Cl.
*H05B 37/02* (2006.01)

(52) U.S. Cl. ..................... 315/209 R; 315/244; 315/307; 315/356

(58) Field of Classification Search .............. 315/209 R, 315/227 R, 237, 238, 240, 241 R, 242, 244, 315/307, 308, 310, 326, 349, 355, 356

See application file for complete search history.

(56) References Cited

U.S. PATENT DOCUMENTS

| | | | |
|---|---|---|---|
| 4,060,751 A | 11/1977 | Anderson | |
| 4,277,728 A | 7/1981 | Stevens | |
| 5,677,602 A | 10/1997 | Paul et al. | |
| 5,925,990 A * | 7/1999 | Crouse et al. | ................. 315/307 |
| 5,932,976 A | 8/1999 | Maheshwari et al. | |
| 5,934,976 A | 8/1999 | Makino et al. | |
| 6,160,362 A | 12/2000 | Shone et al. | |
| 6,380,694 B1 | 4/2002 | Uchihashi et al. | |
| 6,518,712 B2 | 2/2003 | Weng | |
| 6,546,346 B1 | 4/2003 | Laubenstein et al. | |
| 6,965,204 B2 | 11/2005 | Langeslag | |
| 7,019,468 B2 | 3/2006 | Deurloo et al. | |
| 7,110,267 B2 | 9/2006 | Lurkens | |
| 7,141,937 B2 | 11/2006 | Kumagai et al. | |
| 7,365,498 B2 * | 4/2008 | Makimura et al. | ............ 315/219 |
| 7,486,028 B2 | 2/2009 | Langeslag et al. | |
| 7,692,391 B2 | 4/2010 | Nakada et al. | |
| 8,154,215 B2 * | 4/2012 | Miyazaki et al. | ............. 315/247 |
| 2010/0084988 A1 | 4/2010 | Nagata et al. | |

FOREIGN PATENT DOCUMENTS

| | | |
|---|---|---|
| EP | 0 408 121 B1 | 6/1995 |
| EP | 0 456 247 B1 | 10/1995 |
| JP | 52-121975 A | 10/1977 |
| JP | 55-148393 A | 11/1980 |
| JP | 02-215091 A | 8/1990 |

(Continued)

*Primary Examiner* — James H Cho

(74) *Attorney, Agent, or Firm* — Rader, Fishman & Grauer PLLC

(57) ABSTRACT

In an optimum frequency detection sequence of a discharge lamp, the frequency control circuit performs a sweep operation in which, while the frequency control circuit monitors a synchronization degree signal, a frequency control signal is changed, so that frequency is changed, starting from either an upper or lower limit frequency of a periodic driving circuit, in a range that does not exceed the other frequency, wherein after completion of the sweep operation, the frequency control circuit determines a value of the frequency control signal corresponding to a resonance frequency of the resonant circuit, and inputs the value into a frequency driving circuit, wherein at least in a period of the sweep operation, an inverter receives power supply from a sweep time power supply circuit for supplying electric power with constant supply capability, which is limited to a range in which breakdown does not occur in the discharge lamp.

3 Claims, 14 Drawing Sheets

FOREIGN PATENT DOCUMENTS

| | | |
|---|---|---|
| JP | 03-102798 A | 4/1991 |
| JP | 03-167795 A | 7/1991 |
| JP | 04-017296 A | 1/1992 |
| JP | 04-121997 A | 4/1992 |
| JP | 04-272695 A | 9/1992 |
| JP | 04-342990 A | 11/1992 |
| JP | 07-169583 A | 7/1995 |
| JP | 07-230882 A | 8/1995 |
| JP | 08-124687 A | 5/1996 |
| JP | 10-284265 A | 10/1998 |
| JP | 11-265796 A | 9/1999 |
| JP | 2000-195692 A | 7/2000 |
| JP | 2000-012257 A | 7/2001 |
| JP | 2001-511297 T | 8/2001 |
| JP | 2001-515650 T | 9/2001 |
| JP | 2001-338789 A | 12/2001 |
| JP | 2002-151286 A | 5/2002 |
| JP | 2001-501767 A | 9/2002 |
| JP | 2004-127656 A | 4/2004 |
| JP | 2004-146300 A | 5/2004 |
| JP | 2004-221031 A | 8/2004 |
| JP | 2004-265707 A | 9/2004 |
| JP | 2004-327117 A | 11/2004 |
| JP | 2005-038813 A | 2/2005 |
| JP | 2005-038814 A | 2/2005 |
| JP | 2005-050661 A | 2/2005 |
| JP | 2005-507553 T | 3/2005 |
| JP | 2005-507554 A | 3/2005 |
| JP | 2005-515589 T | 5/2005 |
| JP | 2005-520294 A | 7/2005 |
| JP | 2004-095334 A | 10/2005 |
| JP | 2007-005260 A | 1/2007 |
| JP | 2007-103290 A | 4/2007 |
| JP | 2007-173121 A | 7/2007 |
| JP | 2007-179869 A | 7/2007 |
| JP | 2008-027705 A | 2/2008 |
| JP | 2008-171742 A | 7/2008 |
| JP | 2008-243629 A | 10/2008 |
| JP | 2008-269836 A | 11/2008 |

* cited by examiner

FIG. 11
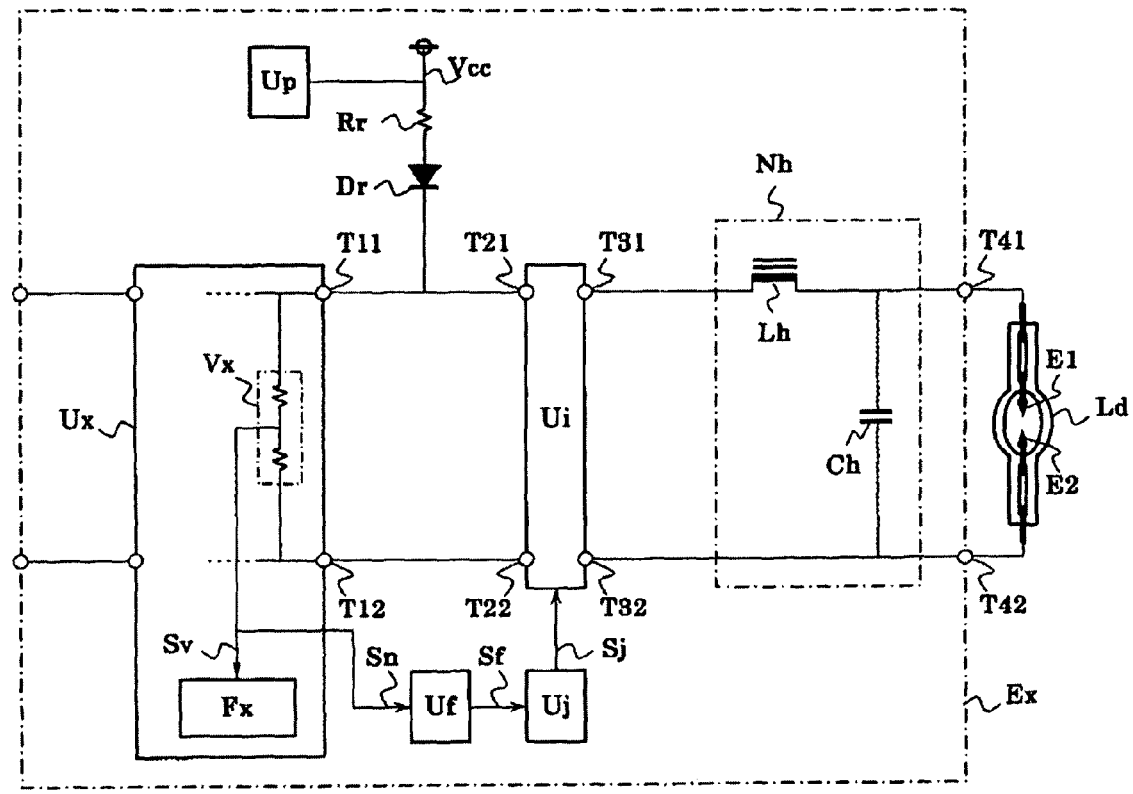
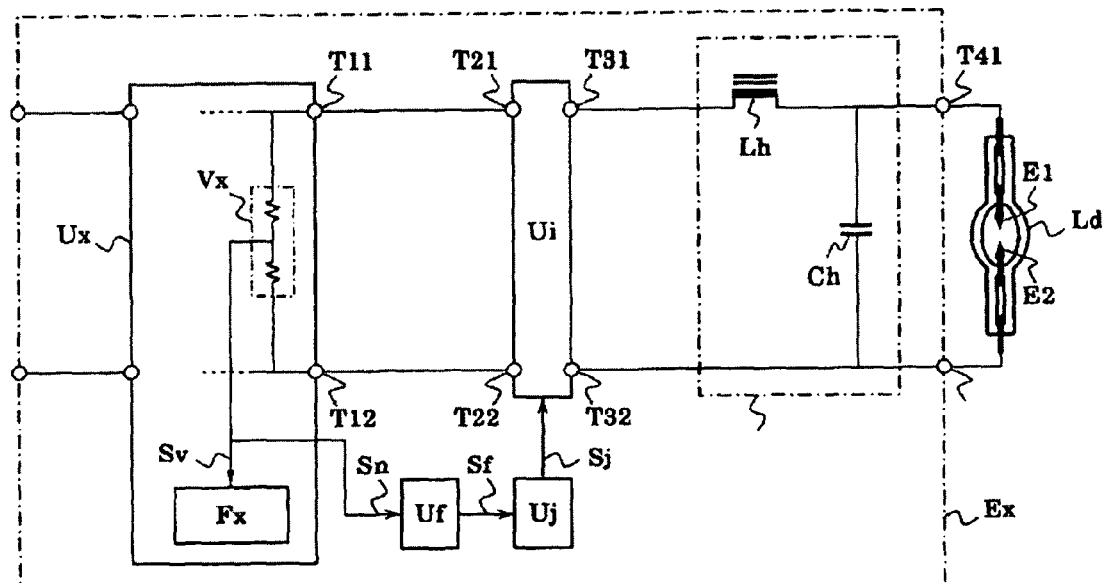
FIG. 12

FIG. 17
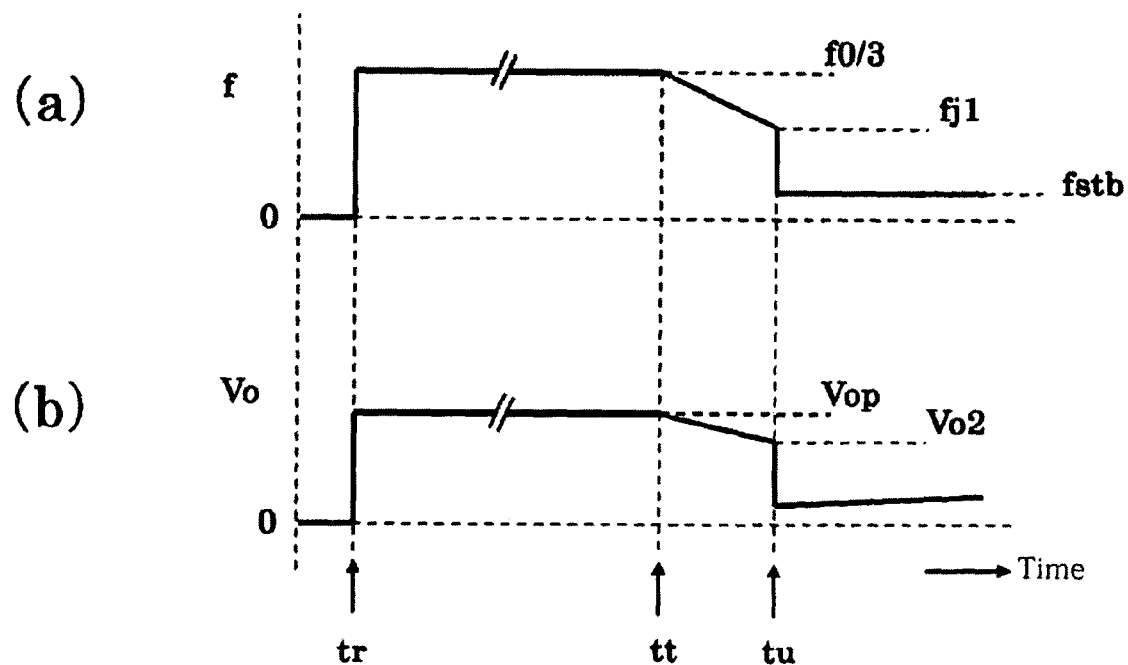
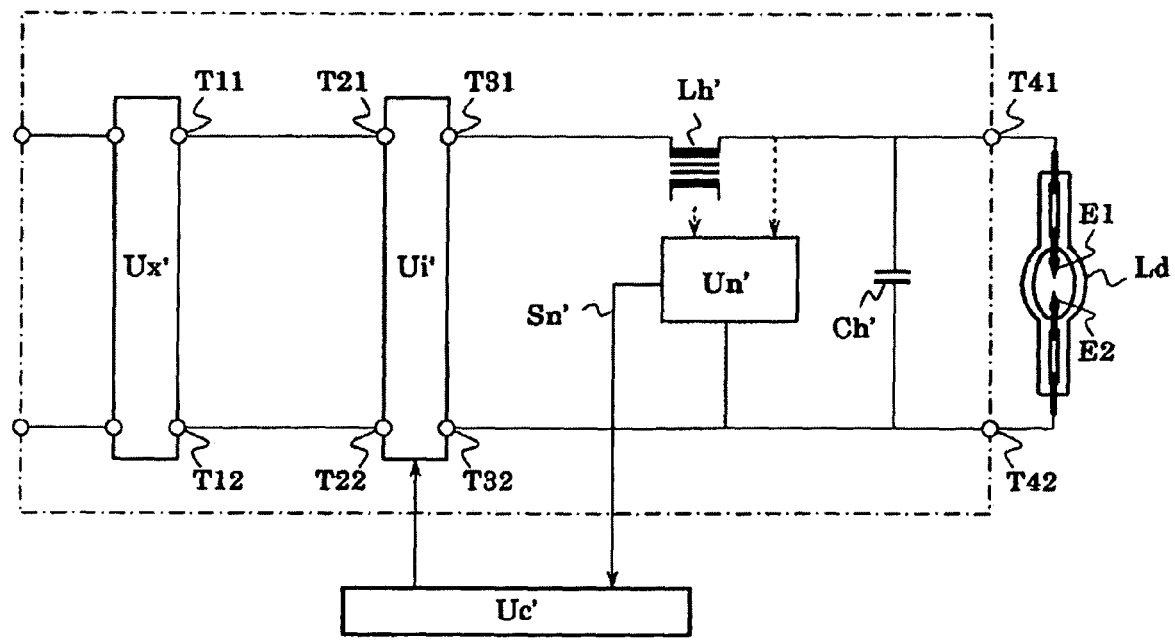
FIG. 18 (Prior Art)

DISCHARGE LAMP LIGHTING APPARATUS

CROSS-REFERENCES TO RELATED APPLICATION

This application claims priority from Japanese Patent Application Serial No. 2009-173957 filed Jul. 27, 2009, the contents of which are incorporated herein by reference in its entirety.

TECHNICAL FIELD

The present invention relates to a discharge lamp lighting apparatus for lighting a high pressure discharge lamp, specifically, a high intensity discharge lamp such as a high pressure mercury lamp, a metal halide lamp, and a xenon lamp, etc.

BACKGROUND

A high intensity discharge lamp (HID lamp) is used for a light source apparatus for an image display optical device such as an LCD projector and a DLP (Trademark) projector. In such a projector, light is separated into the three primary colors of red, green, and blue by a dichroic prism, etc., so that a space modulation element provided for each color generates an image of each of the three primary colors. The optical paths thereof are combined by a dichroic prism, etc., so as to display a color image. In another known type of projector, light emitted from a light source is passed through a rotating filter having three primary color areas (R, G, and B), thereby sequentially generating light rays of the three primary colors. In synchronization with the generated light rays, the spatial modulation device is controlled so as to sequentially generate an image of each of the three primary colors in a time dividing manner, thereby displaying a color image.

As to types of driving methods of a discharge lamp in a steady lighting period, there are a direct-current driving method and an alternating current driving method in which periodic polarity reversals are performed by further providing an inverter. In the case of the direct current driving method, since the light flux from a lamp is like direct current, that is, it does not change with passage of time, basically, there is a big advantage that it can be similarly applied to both types of the above-described projectors. On the other hand, in the case of the alternating current driving method, while development or wear of the electrode(s) of the discharge lamp can be controlled by using the flexibility of polarity-reversal frequency which does not exist in the direct-current driving method.

When this type of a lamp is started, while voltage called no-load open circuit voltage is applied to the lamp, high voltage is applied to the lamp, in order to generate dielectric breakdown in an electrical discharge space, so that the discharge state changes from glow discharge to arc discharge. As a conventional method of carrying out the start-up in a case of an alternating current driving method, there has been a resonance starting which is accomplished by a series resonance system, in which a series resonant circuit made up of a resonance inductor and a resonant capacitor is provided in an output side of an inverter, wherein at a time of start-up, polarity frequency of the inverter is set up so as to agree with the resonance frequency of the resonant circuit, thereby generating a series resonance phenomenon, so that voltage to be applied to the lamp is increased. Furthermore, by using the resonance starting in combination with an ignitor, a peak value of high voltage to be applied thereto is increased thereby increasing starting probability.

FIG. 18 is a schematic view of the structure of an example of a conventional discharge lamp lighting apparatus. The principle of resonance starting will be described below, referring to FIG. 18. The discharge lamp lighting apparatus shown in the figure comprises a power supply circuit (Ux') which supplies electric power to a discharge lamp (Ld), a full bridge type inverter (Ui') for inverting the polarity of an output voltage, and a resonance inductor (Lh') and a resonant capacitor (Ch'), wherein at a start-up time, the inverter (Ui') is driven in an polarity-reversal driving operation at resonance frequency determined by a value of the product of the inductance of the resonance inductor (Lh') and the electrostatic capacity of the resonant capacitor (Ch'), or at frequency close to the resonance frequency, so that high voltage is generated between both terminals of the resonant capacitor (Ch') due to an LC series resonance phenomenon which is developed by the driving, whereby the high voltage is applied to the discharge lamp (Ld).

Although, in order that resonance current which flows through the inverter (Ui') does not become excessive, it is necessary to make the electrostatic capacity of the resonant capacitor small. And to increase the inductance of the resonance inductor to some extent at time of the series resonance operation, if the inductance thereof is large, it tends to cause instantaneous interruption of lamp flux, overshoot, and vibration at a time of steady lighting. And, in such a series resonance system, in order to sufficiently raise voltage applied to a lamp to start up, frequency of a periodic voltage applying unit or frequency of a higher harmonic component thereof needs to be set up so as to agree (namely, be synchronized) with the resonance frequency or oddth frequency of the resonance frequency of the resonant circuit.

However, since there is manufacturing tolerance in parts, even if the inverter (Ui') is driven in a polarity-reversal driving operation at a predetermined and fixed frequency, determined by the design inductance of the resonance inductor (Lh') and the design electrostatic capacity of the resonant capacitor (Ch'), there is a problem in which expected high voltage cannot be obtained. Furthermore, in such a case where there is the manufacturing tolerance, although the resonance frequency of each discharge lamp lighting apparatus may be measured so as to set it up, since there are also effects of the length of cables for connection and a degree of a proximity of the cables to other electrical conductor, etc., there is a problem in which it is difficult to rigorously set up the resonance frequency in advance.

In order to solve this problem, a method of setting up the driving frequency of the inverter (Ui') to the above-mentioned resonance frequency or frequency close to the driving frequency or a method of performing a sweep operation, is proposed in the prior art. FIG. 19 is a simplified timing chart of an example of a conventional discharge lamp lighting apparatus. In the figure, (a) shows a waveform of output voltage (Vnh) which is generated in the resonant capacitor (Ch'), and (b) shows change of the driving frequency (f) of the inverter (Ui). This figure shows that an automatic sweep operation of frequency of alternating current voltage, which the inverter (Ui') generates at a time of start-up of lamp lighting, is repeatedly performed in a predetermined range including the resonance frequency of the resonant circuit, wherein, in a period (Ta), the sweep operation is performed from a lower limit frequency towards a upper limit frequency, and in a process of the operation, the output voltage (Vnh) turns into high voltage at a time point (ta) at which the frequency of the alternating current voltage generated by the inverter circuit is in agreement with the resonance frequency by chance. On the other hand, in a period (Tb), the sweep operation is performed in an opposite direction thereto from the upper limit frequency towards the lower limit frequency. Therefore, the sweep operation is repeated twice or more, in a range of resonance frequencies expected from the manufacturing tolerance, within a predetermined period (T) of start-up time of the lamp lighting, and the high voltage is applied to the discharge lamp (Ld). The peak voltage of this high voltage is set up so as to be 2 kV-5 kV (since the peak voltage is obtained by measuring voltage reaching the peak value from 0 V. The way of measuring the peak of high voltage of alternating current is the same throughout the present specification).

In a period, in which the driving frequency of the inverter (Ui') is largely different from the resonance frequency or frequency close to the resonance frequency (in the figure, all the periods in which output voltage (Vnh) is relatively low, which are typified by a period (Tc)), and which is within the period (T), where high voltage is applied to a discharge lamp so as to start an operation, there is a problem in which, as to the output voltage (Vnh), a rise in voltage due to resonance does not occur at all.

Various proposals in technology such as one described above, have been made conventionally, in which a sweep operation of the driving frequency is repeated and continues over an entire discharge lamp start-up period, without specifying timing at which the driving frequency of an alternating current driving circuit is in agreement with the resonance frequency.

Japanese Patent Application Publication No. H02-215091 discloses that conditions in which the driving frequency is in agreement with resonance frequency is satisfied at least for a moment, and an automatic sweep operation of the frequency of the alternating current voltage, which an inverter circuit generates at start-up time of lighting, is performed in a predetermined range including the resonance frequency of a resonant circuit.

Moreover, Japanese Patent Application Publication No. H03-102798 discloses that a high frequency unit, which makes an LC circuit apply a high voltage to a lamp to start up, is provided so that the lamp may be lighted, wherein the high frequency unit applies, to the LC circuit, frequency that changes with passage of time or frequency that decreases from frequency higher than the resonance frequency with passage of time.

Moreover, Japanese Patent Application Publication No. H04-017296 discloses that when oscillation frequency of an inverter unit is changed into high frequency, it is configured so that the oscillation frequency may be changed within a predetermined range according to output voltage of a saw-tooth wave generating unit or a triangular wave generating unit.

Furthermore, Japanese Patent Application Publication No. H04-272695 discloses that an inverter is controlled so that output frequency of the inverter is continuously changed to frequency lower than a frequency range in which an acoustic resonance phenomenon may occur due to the resonance frequency of an LC circuit at start-up, or an inverter is controlled so that frequency thereof may become lower than a frequency range in which an acoustic resonance phenomenon may occur at stationary time.

Furthermore, Japanese Patent Application Publication No. H10-284265 discloses that frequency of alternating current voltage outputted from an output connection section in a start-up period is swept (changed) within a range including the resonance frequency of a resonant circuit, or alternating current voltage of high frequency is outputted from the output connection section in a start-up period and only the alternating current operating voltage of low frequency is supplied to a discharge lamp in a steady lighting period after the start-up of the discharge lamp.

Furthermore, Japanese Patent Application Publication No. 2000-195692 discloses that, as an embodiment, operating frequency of a bridge in a resonance operation is swept (varied) so as to pass a resonance point.

Furthermore, Japanese Patent Application Publication No. 2001-338789 discloses that the switching frequency of each switching element is controlled so as to be continuously changed for predetermined time, wherein the sweep range of the switching frequency includes resonance frequency determined by an inductor and a capacitor of a load resonance circuit, or frequency is controlled so as to be changed, that is, swept, from higher frequency to lower frequency during a predetermined period, or when the resonance frequency changes after insulation breakdown of a discharge lamp, frequency of an inverter is also changed, so that large energy is supplied to arc discharge, whereby a discharge state of the discharge lamp more stably shifts to arc discharge.

Furthermore, Japanese Patent Application Publication No. 2002-151286 discloses that, as an embodiment, a sweep operation of the driving frequency of an inverter is repeated twice or more times, and the frequency is changed and shifted from high frequency to low frequency in arc lighting.

Furthermore, Japanese Patent Application Publication No. 2004-146300 discloses that as an embodiment, although two resonance systems are used, a sweep operation is performed using a microprocessor, wherein the lower limit frequency and the upper limit frequency of a frequency sweep range are set so as to define a frequency variable range which can be covered even if the resonance frequency changes due to manufacturing tolerance of parts of a resonant circuit section or floating capacitance of an output line from a high pressure discharge lamp lighting apparatus to the lamp.

Furthermore, Japanese Patent Application Publication No. 2004-221031 discloses a discharge lamp lighting apparatus having a control unit for at least setting up frequency in a first step so as to be frequency close to that obtained by dividing resonance frequency of a resonant circuit by an odd number while gradually decreasing frequency of the rectangular wave, wherein the frequency and the duty ratio of a DC-DC converter circuit, which is arranged in an upstream side of an inverter, are changed in order to suppress resonance voltage due to manufacturing tolerance of LC parts.

Furthermore, Japanese Patent Application Publication No. 2005-038813 discloses that, as an embodiment, frequency of an inverter in a high frequency switching operation at start-up time is changed continuously or in a stepwise fashion, in order to perform oddth resonance.

Furthermore, Japanese Patent Application Publication No. 2005-050661 discloses that, as an embodiment, output frequency of an inverter is continuously changed from an upper limit to a lower limit in a discharge lamp start-up time, and if it reaches the lower limit, the same operation is repeated after returning to the upper limit, so as to pass a resonance point.

Furthermore, Japanese Patent Application Publication No. 2005-038814 discloses that, as an embodiment, although a half bridge function and a step down chopper function are attained by two switching elements, frequency of an inverter is swept by dividing it twice or more times, in order to perform and operate at start-up at frequency which is one divided by an odd number of the resonance frequency.

Furthermore, Japanese Patent Application Publication No. 2008-243629 discloses that, in order to obtain resonance frequency, a sweep operation of frequency of an inverter is repeatedly carried out, or frequency of an inverter in an unloaded condition, starting improving mode, and each mode in a steady lighting state, is set as follows: non-load condition>steady lighting state>starting improving mode.

Thus, the proposal of the prior art is described above, that is, a sweep operation of the driving frequency is repeated and continues over an entire discharge lamp start-up period, without specifying timing at which the driving frequency of an alternating current driving circuit such as an inverter is in agreement with the resonance frequency. However, as described above, in an operation period, in which the inverter (Ui') is operated at a frequency largely different from the resonance frequency or from a frequency close to the resonance frequency, and which is within the period (T) where high voltage is applied to a discharge lamp so as to start an operation, the problem in which a rise in voltage due to resonance does not occur at all has not been solved.

In order to solve this problem, in the prior art, it has been proposed that driving frequency of the inverter (Ui') is automatically synchronized with or set to the resonance frequency of the resonant circuit which is made up of the resonance inductor (Lh') and the resonant capacitor (Ch'), or a frequency close thereto or a higher order resonance frequency.

Description of a discharge lamp lighting apparatus shown in FIG. 18 will be given below. The circuit includes an a full bridge type inverter (Ui') for inverting the polarity of an output voltage, and a resonance inductor (Lh') and a resonant capacitor (Ch'), wherein a polarity-reversal driving operation is performed at a resonance frequency or a frequency close to the resonance frequency, so that high voltage is generated between both terminals of the resonant capacitor (Ch') due to an LC series resonance phenomenon which is developed by the driving, whereby the high voltage is applied to the discharge lamp (Ld). However, a synchronization degree detection unit (Un'), which serves as a detection unit for detecting whether resonant condition is realized, is provided in order to control the output voltage (Vnh).

FIG. 20 is a schematic timing chart of an example of a conventional discharge lamp lighting apparatus, in a case where the synchronization degree detection unit (Un') for controlling the inverter (Ui') relating to series resonance, is used. In the figure, (a) shows a waveform of output voltage (Vnh) generated in the resonant capacitor (Ch'), and (b) shows change of the driving frequency (f) of the inverter (Ui'). The figure shows frequency of alternating current voltage, which the inverter (Ui') generates at a time of lighting start-up, is automatically changed in a range including a resonance frequency of a resonant circuit, wherein in a period (Td), a sweep operation is performed from a lower limit frequency towards an upper limit frequency, and at time (td), resonance is realized and the synchronization degree detection unit (Un') formed from a voltage detection unit detects that output voltage (Vnh) reached a target voltage, so that the frequency (fp) is maintained thereby generating intended high voltage continuously.

Since the output voltage (Vnh) is set up so that peak voltage may be set to 2 kV-5 kV as described above, the synchronization degree detection unit (Un') needs to have the capability of withstanding the high voltage. As an example of the detection unit for realizing the resonant condition, it is necessary to measure voltage between a connection node of a resonant capacitor (Ch') and a resonance inductor (Lh'), and a ground, or between both ends of a discharge lamp (Ld), thereby generating a signal. For example, resistor elements and capacitors are in series aligned, in order to withstand the high voltage, so that a signal can be acquired from a middle point thereof at which voltage is divided. However, in such an example, since the number of component parts increases, there is a problem in which it becomes disadvantageous in view of a miniaturization and cost reduction of such a discharge lamp lighting apparatus.

Moreover, as another example of the detection unit for realizing the resonant condition, a secondary winding which has a small turn ratio suitable for a resonance inductor (Lh') is added thereto, and a resonance inductor (Lh') is configured so as to have a transformer structure, wherein a signal having amplitude voltage which is obtained from the secondary winding and which is approximately proportional to amplitude voltage of the resonance inductor (Lh'), is rectified by using a resistor, a diode, a capacitor, etc., thereby forming the voltage detection unit. However, in this example, since the above described high voltage is generated at the resonance inductor at start-up time, in the resonance inductor (Lh'), which has the transformer structure, it is necessary to sufficiently secure insulation of a secondary winding to the high voltage generating section, and to prevent breakdown or corona discharge. Therefore, there is a problem in which a method of sufficiently providing a barrier tape or a tape between winding layers, or a method of separating each winding, section by section, is adopted, thereby causing an increase in cost.

As another example of the detection unit for detecting that the resonant condition is realized, by using a phenomenon in which large current flows from the inverter (Ui') when the driving frequency of an inverter (Ui') is in agreement with the resonance frequency of a resonant circuit, providing a current detection unit for the inverter (Ui') is considered. However, when a resistor having small resistance is used as the current detection unit, there is a problem in which unnecessary resistive loss may be caused since current also flows therethrough steadily in a steady operation during which a discharge lamp is lighted, or cost increases in a case of a system in which a current transformer is arranged at an output of the inverter (Ui').

As still another example of the detection unit for detecting that the resonant condition is realized, a system is proposed, in which a current phase detection unit for an inverter, and a voltage phase detection unit for the inverter are provided so that a detected inverter current phase and an inverter voltage phase are compared with each other, whereby a feedback operation is performed to actually realize a predetermined phase relation. However, similar to above, in this system, a circuit for the comparison/judgment of a phase and a current transformer for current detection or a resistor for current detection are required, so that there is a drawback of an increase in cost.

As stated above, various technologies having a detection unit for detecting whether a resonant condition is realized, in which the driving frequency of an inverter is set up so as to be in agreement with resonance frequency in order to continuously generate high voltage, have been conventionally proposed.

For example, Japanese Patent Application Publication No. S52-121975 discloses that where operation frequency is changed and then the operation frequency is fixed when a resonance condition is detected, an inverter is driven at the triple harmonic resonance frequency, and the inverter looks for the resonance frequency so that an operation is performed at the frequency.

For example, Japanese Patent Application Publication No. S55-148393 discloses that in a case where a resonant condition is maintained like self-oscillation, a unit for detecting current which flows through a resonant circuit at time of start-up of a discharge lamp containing gas, is prepared, wherein when a change rate thereof is the maximum or close to the maximum, frequency of an inverter is maintained at the resonance frequency of the resonant circuit by commutating the voltage which is applied to the resonant circuit.

Moreover, Japanese Patent Application Publication No. 2000-012257, similar to the above, in the case where a resonant condition is maintained like self-oscillation, where a discharge lamp is started in a resonant condition, synchronization is automatically performed by self-oscillation of a resonant circuit which is made up of an inductor and a capacitor.

Furthermore, Japanese Patent Application Publication No. 2001-501767 discloses that a detection unit is configured so that a state of a gas discharge lamp is detected, and a control circuit unit controls frequency of an inverter as a function of an output of the detection unit. The Japanese Patent Application Publication also discloses that a feedback circuit unit for effectively changing frequency of an inverter in response to an electric power detection unit is provided, wherein electric power supplied to a gas discharge lamp is maintained to approximately a predetermined level. Further, the Japanese Patent Application Publication No. 2001-501767 discloses that the inverter is configured so as to be continuously operated at a frequency which decreases so that the frequency approaches a resonance frequency until a gas discharge lamp starts and thereafter; the inverter is configured so as to be operated at a frequency that decreases so as to approach frequency close to a specific frequency until at least the operation of the gas discharge lamp shifts from glow discharge mode to arc discharge mode; and the inverter is operated at a frequency higher than other resonance frequency after the operation of the gas discharge lamp shifts from glow discharge mode to arc discharge mode, so that the gas discharge lamp starts, and shifts from the glow discharge mode to the arc discharge mode, and further is operated in a steady state. Or, the Japanese Patent Application Publication discloses that a step in which the inverter is operated at frequency which decreases so that it may approach from specific frequency to resonance frequency until the gas discharge lamp starts; a step in which the inverter is operated at a frequency that increases so as to approach the specific frequency until the gas discharge lamp shifts from glow discharge to arc discharge; and a step in which the inverter is operated at a frequency higher than other resonance frequency at which the gas discharge lamp is stably operated.

Furthermore, Japanese Patent Application Publication No. 2001-511297 discloses that a system of a detection and determination method of resonance frequency at the driving frequency of a bridge is proposed, wherein a search method is performed based on random sampling and, for example, is continuously carried out until breakdown of the gas electric light lamp and an ignition of the gas discharge lamp occur.

Furthermore, Japanese Patent Application Publication No. 2001-515650 discloses that bridge frequency is decreased in each phase of non-load, glow discharge and arc discharge, wherein first, a resonance ignitor is controlled so as to be excited at a frequency sufficiently higher than a nominal resonance frequency, and an excitation frequency is decreased while supervising lamp terminal voltage, or where frequency is decreased toward the nominal resonance frequency and the terminal voltage of the lamp increases, when and the measured lamp terminal voltage reaches a minimum value at the controlled frequency, a controller stops decreasing the frequency and the lamp is continuously excited over designated minimum duration at this frequency.

Furthermore, Japanese Patent Application Publication No. 2004-095334 discloses that a frequency detection unit for detecting frequency of a driving voltage of an inverter and a voltage detection unit for detecting a voltage that is generated by driving a resonant circuit, are provided in a resonant circuit unit, wherein the driving frequency is changed from a high frequency to a low frequency whereby frequency at the time when the voltage detection unit detects the maximum voltage, is set as the driving frequency. The Japanese Patent Application Publication No. 2004-095334 also discloses that the driving frequency is changed from high frequency to low frequency whereby frequency at the time when the voltage detection unit detects a threshold voltage, is set as the driving frequency. Further, the Japanese Patent Application Publication also discloses that in the above-mentioned frequency detection, constant voltage smaller than starting voltage, which may start a discharge lamp, is applied to a resonant circuit, or the secondary winding of a resonance inductor is used as a voltage detection unit, or a measurement is performed at a connection node of a resonant capacitor and a resonance inductor.

Moreover, Japanese Patent Application Publication No. 2004-127656 discloses that after frequency of output voltage of an inverter circuit is set to a frequency lower than the oddth resonance frequency of a resonant circuit in order to turn on a discharge lamp, the frequency of output voltage is increased gradually or stepwise, and the frequency of the output voltage, at a time when the amplitude of oscillating voltage of the resonant circuit becomes a predetermined value or greater, is set as the frequency of the output voltage of the inverter circuit. Also, the Japanese Patent Application Publication No. 2004-127656 discloses that when the amplitude of the output voltage of the resonant circuit does not reach a predetermined value or greater within a predetermined time, after the frequency of the output voltage reaches an upper limit, if the amplitude of the output voltage of the resonant circuit becomes the predetermined value or greater in a process in which the frequency is decreased to targeting an initial frequency, which is a frequency at a time of start-up, at a speed equivalent to the speed at time when the frequency was increased, a frequency which is a few hundredth of percent lower than the frequency at that time, is set. On the other hand, in the process in which the frequency is decreased, when the amplitude of the output voltage of the resonant circuit does not reach the predetermined value or greater, but reaches the initial frequency, an operation in which the frequency is increased again is repeated until the lamp is turned or a predetermined maximum time lapses.

Furthermore, Japanese Patent Application Publication No. 2004-327117 discloses that operation frequency of high-frequency voltage which is generated in an inverter circuit unit is set up to resonance frequency of a resonant circuit or frequency which is approximately odd times the frequency thereof, so that a high voltage pulse can be outputted, and a frequency sweep operation is carried out so that a high voltage pulse can be approximately uniformly outputted, wherein resonance boosting voltage is detected, and when it becomes approximately a target voltage value, the resonance boosting voltage is stopped, or operation frequency is fixed, and an output having approximately a target voltage value continues for a fixed period, or when it becomes approximately the target voltage value, the operation frequency is swept in a direction opposite to the previous sweeping direction so that the output which is approximately the target voltage value or less continues for the a fixed period, or a resonance voltage detection unit is formed by a secondary winding of an inductor of the resonant circuit, or the resonance voltage detection unit is formed by a voltage dividing resistors connected to both ends of a capacitor of the resonant circuit, or a frequency sweep operation is controlled by a microprocessor.

Furthermore, Japanese Patent Application Publication No. 2005-520294 discloses that in order to perform automatic synchronization, as to synchronization based on automatic feedback of a third resonance, for example, an antenna circuit is used as a detecting unit for detecting an output of high voltage generated in a resonant circuit, and a feedback operation is carried out using a PLL circuit.

Japanese Patent Application Publication No. 2005-515589 discloses that, in an automatic synchronization unit, a feedback operation is carried out by using a VCO and a microprocessor, or voltage, current, and high voltage is fed back.

Furthermore, Japanese Patent Application Publication No. 2005-507554 discloses a ballast apparatus, in which the coefficient of self-induction of a coil, and a value of electrostatic capacity of a capacitor, and time jitter switching frequency are related to one another at a certain time during frequency change, so that at least the oddth harmonic frequency of the time jitter switching frequency approaches resonance frequency of the coil and the capacitor.

Furthermore Japanese Patent Application Publication No. 2005-507553 discloses a system in which a unit for measuring voltage of both ends of a discharge lamp is provided in order that a bridge in which an ignitor is being operated, performs a high order resonance operation, wherein the driving frequency of the bridge for performing resonance operation is swept before discharge starting, so that frequency is fixed when target voltage is reached, or a method in which after lighting, it is gradually shifted to a low frequency operation.

Furthermore, Japanese Patent Application Publication No. 2007-103290 discloses that a unit for measuring voltage generated in a resonant circuit is provided, so that frequency of a bridge is swept in order to perform a resonance operation at a time of non-load, and the frequency is fixed when the target voltage is reached.

Furthermore, Japanese Patent Application Publication No. 2007-173121 discloses that the driving frequency of an inverter is changed continuously or stepwise from high frequency to low frequency, and based on a value obtained from resonance voltage, it is determined whether the resonance voltage reaches a second voltage level, and after a determination result of reaching the level is obtained, variable frequency is fixed so that the resonance voltage may be maintained to the second voltage level.

Furthermore, Japanese Patent Application Publication No. 2007-179869 discloses that, in a starting sequence of a discharge lamp, a frequency control circuit carries out a sweep operation, by which a frequency control signal is changed, while monitoring a synchronization degree signal, so that frequency is changed, starting from either an upper limit frequency or a lower limit frequency of a frequency variable oscillator, in a range which does not exceed the other frequency, and after completion of the sweep operation, the frequency control circuit determines a value of a frequency control signal with respect to resonance frequency of a resonant circuit, and inputs it into a frequency variable oscillator. In addition, the Japanese Patent Application Publication discloses that, after determining the value of the frequency control signal, the sweep operation covering a narrow range continues, in order to respond to drift of the resonance frequency, and further, the resonant circuit is configured to have the structure using a parallel resonant circuit, and a resonance inductor is configured to have a transformer structure so that the synchronization degree signal may be monitored.

Furthermore, Japanese Patent Application Publication No. 2008-027705 discloses that as a first voltage measurement unit, a resistor and a capacitor are connected to a secondary winding of a resonance inductor, so as to be used for feedback of an output of high voltage due to a resonant action.

Furthermore, Japanese Patent Application Publication No. 2008-269836 discloses that a capacitor and a resistor are connected to a secondary winding of a resonance inductor, so as to be used for feedback of an output of high voltage due to a resonant action, wherein resonance voltage is indirectly detected, and inverter driving frequency is fixed to a frequency at the time when target voltage is met.

Thus, the proposals of the prior art are explained above, that is, a detection unit for detecting whether the resonant condition is realized, is provided, and the driving frequency of an inverter is set up so as to be in agreement with resonance frequency, so that high voltage is continuously generated. However, as described above, the detection unit for detecting whether the resonant condition is realized, is required, so that there is a problem of causing an increase in cost.

These are problems in steps up to generating the high voltage accompanying resonance phenomena in a resonant circuit so as to apply it to a lamp, thereby causing breakdown in the lamp. However, in order to realize a stable lighting state as a discharge lamp lighting apparatus, there remains a problem in that after a breakdown occurs in a lamp so that electric discharge begins, a step in which the driving frequency of an inverter is shifted from a high resonance frequency to a low frequency at which it is in a final stable lighting state, must be certainly and safely completed.

As the technology of switching of the driving frequency of an inverter at a time a high voltage is applied to a discharge lamp and at time of a stable condition, there is a case where a function of resonance starting for certainly shifting from glow discharge to arc discharge is included in a process, or a case where a function where asymmetrical electric discharge phenomenon used in a starting method of applying a high frequency wave, in which current flows only in a direction of one side of a discharge lamp electrode, converges for a short time, and functions of shifting and lighting are stably carried out in both directions of the discharge lamp electrode while suppressing damages to an electrode, are included in the process.

In order to improve them, a method of effectively switching or changing the frequency of an inverter, or a method of switching a current value to a discharge lamp, have been proposed conventionally.

Japanese Patent Application Publication No. H03-167795 discloses that when a start of discharge in a discharge lamp is detected, operation frequency of switching elements is gradually changed from a frequency at time of non-load to a frequency at time of lighting, wherein when asymmetrical electric discharge occurs, passage of extreme overcurrent in a lighting direction is prevented in order not to drop frequency rapidly.

Furthermore, Japanese Patent Application Publication No. H04-121997 discloses that after a lamp is initiated, the frequency is changed to low frequency from resonance frequency or the frequency close thereto, or the frequency is continuously decreased.

Furthermore, Japanese Patent. Application Publication No. H04-342990 discloses that at a start-up time of a discharge lamp, an inverter is driven wherein output frequency is close to resonance frequency in an LC series resonant circuit, and if an output of a lamp current detection unit exceeds a predetermined value, an output or frequency of the inverter is switched to a decreased and predetermined value.

Furthermore, Japanese Patent Application Publication No. H07-169583 discloses that a frequency control unit for changing frequency of output voltage of a direct current/alternating current conversion circuit is provided, wherein when a light-out state of a discharge lamp is judged by a lighting judgment unit, a frequency control unit increases frequency of output voltage of the direct current/alternating current conversion unit to a value which is sufficient to cause series resonance by an inductor and a capacitor, and moreover, when the lighting state of a discharge lamp is judged by the lighting judgment unit, the frequency control unit decreases the frequency of the output voltage of the direct current/alternating current conversion circuit.

Furthermore, Japanese Patent Application Serial No. H07-230882 discloses that in a predetermined period after start-up, an inverter unit is continuously operated at frequency that is a resonance frequency or more of a series resonant circuit, and which is close to the resonance frequency.

Furthermore in Japanese Patent Application Publication No. H08-124687 discloses that a resonant circuit makes a full bridge operate at a high order resonance frequency only at a time of non-load, and when a lamp is turned on, a frequency switching control circuit applies voltage of low frequency to the lamp.

Furthermore, Japanese Patent Application Publication No. H11-265796 discloses that when it is judged that a discharge lamp is shifted to a lighting state, it is changed to a predetermined value in which frequency is decreased.

Furthermore, Japanese Patent Application Publication No. 2004-265707 discloses that a full bridge is operated at high order resonance frequency, using an LC resonance circuit, and after lighting, voltage of low frequency is applied to a lamp, wherein a period during which a resonant circuit generates high voltage, and a period during which it outputs direct current voltage or a different period are repeated by turns.

Furthermore, Japanese Patent Application Publication No. 2008-171742 discloses that after a predetermined time lapses from time when a lamp is started, it is determined that the electric discharge occurs at a base portion or at a tip portion, wherein when it is the electric discharge at a tip portion, the operation is changed from a high frequency wave operation to a low frequency steady operation, but when it is the electric discharge at a base portion, the high frequency wave operation continues.

Furthermore, Japanese Patent Application Publication No. 2007-005260 discloses that if a judging circuit for judging that full wave electric discharge or asymmetrical electric discharge occurs in a discharge lamp, if it judges that it is the full wave electric discharge, constant current, which is set up so that the discharge lamp is made to shift to a stable lighting state within a predetermined period, is supplied to the discharge lamp, and on the other hand, if the judging circuit judges it is the half wave discharge, a switching unit switches current which flows between both electrodes so that the current with a peak value larger than the above-mentioned constant current is supplied to the discharge lamp DL.

SUMMARY

In a case where a detection unit for detecting whether a resonant condition is realized, is provided and the driving frequency of an inverter (Ui') is set up so as to be in agreement with resonance frequency in order to continuously generate high voltage, there remain problems which have not been solved by the prior art. As to the structure of the detection unit for detecting whether a resonant condition is realized, as described above, in the case where two or more resistance elements and capacitors are aligned in series in order to withstand the high voltage and a signal from a voltage dividing point is obtained, the number of component parts increases; in a case where a secondary winding that has a small number of turns ratio is added to a resonance inductor (Lh'), it is necessary to sufficiently secure insulation of the secondary winding to a high voltage generating unit; in a case where resonance current is detected without using a resistor, a current transformer becomes necessary; or in a case where a resonance condition is detected from a phase of voltage and current, a circuit for comparing and judging the phase thereof is necessary. In any of these cases, there are costs to meet such needs.

Moreover, in a case of a high intensity discharge lamp, if it is not in a state where electric discharge is not generated in the lamp, it is difficult to judge whether resonant condition is realized. While glow discharge or arc discharge is generated, voltage between both poles of the lamp turns into voltage peculiar to a discharge state of the lamp as if it is a zener diode, and electric power is consumed by the lamp, so that a Q value of a resonant circuit becomes low.

For example, when a sweep operation of the driving frequency of an inverter (Ui') is performed and conditions where detection voltage becomes the highest are found while detecting voltage applied to the lamp, since electric discharge occurs in the lamp when a resonant condition is realized, detection voltage rather decreases. Therefore, there is a problem in which it becomes difficult to make a judgment for finding the conditions where the detection voltage becomes the highest. Moreover, even if speeding-up of the judgment sequence is performed so as to detect that a resonant condition is realized even in a case where electric discharge occurs, since the electric discharge phenomenon generated under the sweep operation of the frequency has a history, and since the relation of the amount of a rise of voltage due to the resonance phenomenon and the driving frequency of an inverter, which should have had originally one to one relation, is lost, it is difficult to find out the optimal value of the driving frequency of the inverter (Ui').

Furthermore, a step, in which the driving frequency of an inverter is shifted from a high resonance frequency to a low frequency at which lighting is in a final stable state, must be safely and certainly completed. There is always a possibility that light-out of electric discharge occurs until all the electric discharge substances enclosed in the lamp evaporates, even if the state of the lamp shifts to glow discharge or an arc discharge. For example, in a case of a high pressure mercury lamp in which mercury is enclosed, although arc discharge, which is called field emission, occurs from liquid mercury adhering to an electrode that is a cathode, it will try to return to the glow discharge when the liquid mercury is depleted. In such a case, since voltage of the glow discharge is higher than arc discharge, if a power supply circuit cannot promptly supply such a voltage that is sufficient to maintain the glow discharge, electric discharge may go out. There is also a way of devising a measure for enhancing the capability of a power supply circuit so that the probability of occurrence of this phenomenon may become zero. However, it is not realistic since cost thereof increases in general. Therefore, it is necessary to consider the structure capable of promptly resuming resonance initiation when the electric discharge goes out.

Moreover, even if a breakdown occurs in a lamp due to resonance initiation, thereby succeeding in starting electric discharge, unless shifting to arc discharge from glow discharge can be completed for a short period in both directions of high frequency alternating current, a period, during which a spattering phenomenon on an electrode of a discharge lamp arises, becomes long, so that the electrodes deteriorate and blackening is caused. As a result, there is a possibility of shortening a life span thereof. In particular, when the so-called asymmetrical electric discharge, where electric discharge in one of the current directions does not shift to arc discharge, continues over a long period, for example, until after shifting to low frequency, there may be adverse effects on a life span thereof.

It is an object of the present invention to offer a discharge lamp lighting apparatus in which, even if there is variation in a resonance frequency of a resonant circuit, frequency of a periodic voltage applying unit can be synchronized, and even when light-out occurs at a time when it returns from arc discharge to glow discharge, etc., a resonance operation can be resumed promptly. According to a present invention, a discharge lamp lighting apparatus for lighting a discharge lamp (Ld) in which a pair of electrodes (E1, E2) for main discharge are arranged so as to face each other, comprises a power supply circuit (Ux) that supplies electric power to the discharge lamp (Ld), an inverter (Ui) that is provided in a downstream side of the power supply circuit (Ux) and that performs polarity reversals of voltage applied to the discharge lamp (Ld), a periodic driving circuit (Uj) that generates an inverter driving signal (Sj) that is a periodic signal for carrying out periodic driving of the inverter (Ui), a frequency control circuit (Uf) that generates a frequency control signal (Sf) for controlling frequency of the periodic driving circuit (Uj), a resonant circuit (Nh), which is made up of a resonance inductor (Lh) and a resonant capacitor (Ch), which is arranged in a downstream side of the inverter (Ui), and that boosts voltage supplied to the discharge lamp (Ld) at start-up time of the discharge lamp (Ld), by an boosting action accompanying a resonance phenomenon, a synchronization degree detection unit (Un) that generates a synchronization degree signal (Sn) corresponding to a difference between frequency of the periodic driving circuit (Uj), and a resonance frequency of the resonant circuit (Nh), wherein in an optimum frequency detection sequence of the discharge lamp (Ld), the frequency control circuit (Uf) performs a sweep operation in which, while the frequency control circuit (Uf) monitors the synchronization degree signal, the frequency control signal (Sf) is changed, so that frequency is changed, starting from either an upper limit frequency or a lower limit frequency of the periodic driving circuit (Uj), in a range which does not exceed the other frequency, wherein after completion of the sweep operation, the frequency control circuit (Uf) determines a value of the frequency control signal (Sf) corresponding to the resonance frequency of the resonant circuit (Nh), and inputs the value into a frequency driving circuit (Uj), wherein at least in a period of the sweep operation, the inverter (Ui) receives power supply from a sweep time power supply circuit (Uy) for supplying electric power with constant supply capability, which is limited to a range in which breakdown does not occur in the discharge lamp (Ld), and wherein the synchronization degree signal (Sn) corresponds to output voltage of the sweep time power supply circuit (Uy).

In the discharge lamp lighting apparatus according to the present invention, the sweep time power supply circuit (Uy) may supply output voltage from a constant voltage power supply (Up) through a resistor (Rr).

In the discharge lamp lighting apparatus according to the present invention, in a period of the sweep operation, the power supply circuit (Ux) performs an operation with the constant supply capability, so that the power supply circuit (Ux) serves as the sweep time power supply circuit (Uy).

According to the present discharge lamp lighting apparatus, even if there is variation in the resonance frequency of the resonant circuit, frequency of the periodic voltage applying unit can be synchronized, and even when light-out occurs at a time when it returns from arc discharge to glow discharge, etc., a resonance operation can be resumed promptly.

BRIEF DESCRIPTION OF THE DRAWINGS

Other features and advantages of the present discharge lamp lighting apparatus will be apparent from the ensuing description, taken in conjunction with the accompanying drawings, in which:

FIG. 11 is a simplified block diagram of an embodiment of a discharge lamp lighting apparatus according to the present invention;

FIG. 12 is a simplified block diagram of an embodiment of a discharge lamp lighting apparatus according to the present invention;

FIG. 17 is a simplified timing diagram of an embodiment of a discharge lamp lighting apparatus according to the present invention;

FIG. 18 shows the simplified structure of one form of a conventional discharge lamp lighting apparatus;

DESCRIPTION

Figure 1:
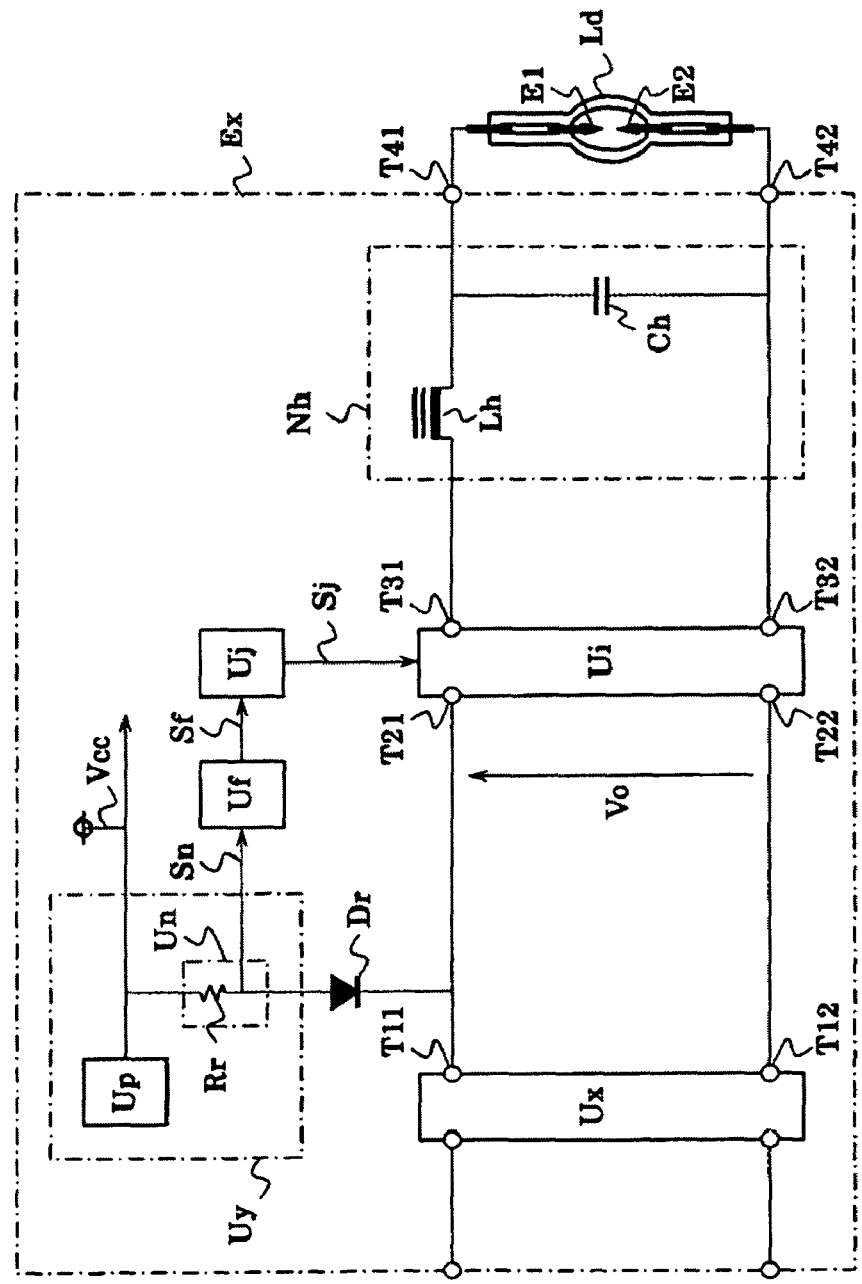
FIG. 1 is a simplified block diagram showing an embodiment of a discharge lamp lighting apparatus according to the present invention.

Description of one of embodiments of the discharge lamp lighting apparatus according to the present invention will be given below, referring to FIG. 1 which is a schematic block diagram. A power supply circuit (Ux), which is made up of, for example, a step down chopper or boost chopper, etc., type switching circuit, outputs suitable voltage and current, according to a state of a discharge lamp (Ld) or lighting sequence thereof. An inverter (Ui), which is made up of a full bridge circuit, etc., converts the output voltage of the power supply circuit (Ux), to alternating current voltage, which is, for example, reversed periodically, and outputs it therefrom, so that voltage is applied through a resonant circuit (Nh), which is made up of a resonance inductor (Lh) and a resonant capacitor (Ch), to a pair of electrodes (E1, E2) for main discharge of the discharge lamp (Ld).

In addition, non-load open circuit voltage applied to the lamp at start-up thereof is typically approximately 200 V, the lamp voltage at time of glow discharge is typically approximately 100-200 V, and the lamp voltage immediately after shifting to arc discharge is typically approximately 10 V. At the time of glow discharge and arc discharge, the power supply circuit (Ux) is controlled so that the flowing current does not exceed a predetermined limit current value.

The resonance frequency of the resonant circuit (Nh) is calculated mainly depending on the product of the electrostatic capacity of the resonant capacitor (Ch) and the inductance of the resonance inductor (Lh). At a start-up time, a periodic inverter driving signal (Sj) is outputted from a periodic driving circuit (Uj) to the inverter (Ui). When the above-mentioned resonance frequency to the inverter driving signal (Sj) outputted from the periodic driving circuit (Uj) is in relation of fundamental wave resonance or high order resonance, or in relation close thereto, a resonance phenomenon occurs in the resonant circuit (Nh), so that resonance current flows therethrough, whereby high voltage occurs in the resonance inductor (Lh) and the resonant capacitor (Ch).

For example, voltage potential difference of a node (T31) to a node (T32) is 200 V, and voltage having a peak of 2 kV-5 kV is applied between a node (T42) and a node (T41), that is, between the electrode (E1, E2) for main discharge of the discharge lamp (Ld).

Under the existence of manufacturing tolerance of the resonant circuit (Nh), specifically manufacturing tolerance in the resonance frequency which is attributed to, for example, manufacturing tolerance in the electrostatic capacity of the resonant capacitor (Ch) and/or the inductance of the resonance inductor (Lh), in the present invention, the driving frequency of the inverter (Ui) is variable in order to satisfy a resonance condition. Therefore, the periodic driving circuit (Uj), which generates the inverter driving signal (Sj) for driving the inverter (Ui), includes, as a component, a frequency variable oscillator, which is an oscillator capable of changing the oscillation frequency. The periodic driving circuit (Uj) receives a frequency control signal (Sf), whereby the oscillation frequency thereof is controlled by the input, wherein the voltage amplitude of the frequency control signal (Sf) and the height of oscillation frequency are in relation of, for example, positive correlation. Of course, it may be in relation of negative correlation.

On the other hand, in order to synchronize the oscillation frequency of the periodic driving circuit (Uj) with the resonance frequency, it is necessary to detect how much the resonance condition is satisfied. Therefore, it is necessary to configure the synchronization degree detection unit (Un) so as to generate the synchronization degree signal (Sn) which changes in amplitude according to the difference between the frequency of the inverter (Ui) and the resonance frequency of the resonant circuit (Nh), i.e., the fundamental frequency or its high order resonance frequency. Although in order to realize it, the constant voltage power supply (Up) that forms a sweep time power supply circuit (Uy) may be separately provided therefrom, since a control circuit DC power source (Vcc) for operating a sequence control unit, a logical circuit and/or a control circuit for analog signal processing, is provided in the discharge lamp lighting apparatus, FIG. 1 shows a case where the control circuit DC power source (Vcc) also serves as the constant voltage power supply (Up). In addition, voltage of 3.3 V-20 V is generally used for the control circuit DC power source (Vcc). Moreover, the control circuit DC power source (Vcc) may be provided thereoutside. In the circuit shown in this figure, when the power supply circuit (Ux) is a resting state, voltage is supplied to a node (T21) in an input positive terminal side of the inverter (Ui), from the control circuit DC power source (Vcc) through a series circuit of a resistor (Rr) and a diode (Dr). And, the synchronization degree signal (Sn) is obtained from a connection point of the diode (Dr) and the resistor (Rr).

While an output of the control circuit DC power sources (Vcc) is 3.3 V-20 V, an output of the power supply circuit (Ux) becomes approximately 200 V in a state where non-load open circuit voltage is outputted, so that voltage becomes the largest. Therefore, the diode (Dr) is provided so that high voltage may not be applied to the control circuit DC power source (Vcc) from the power supply circuit (Ux).

Figure 2:
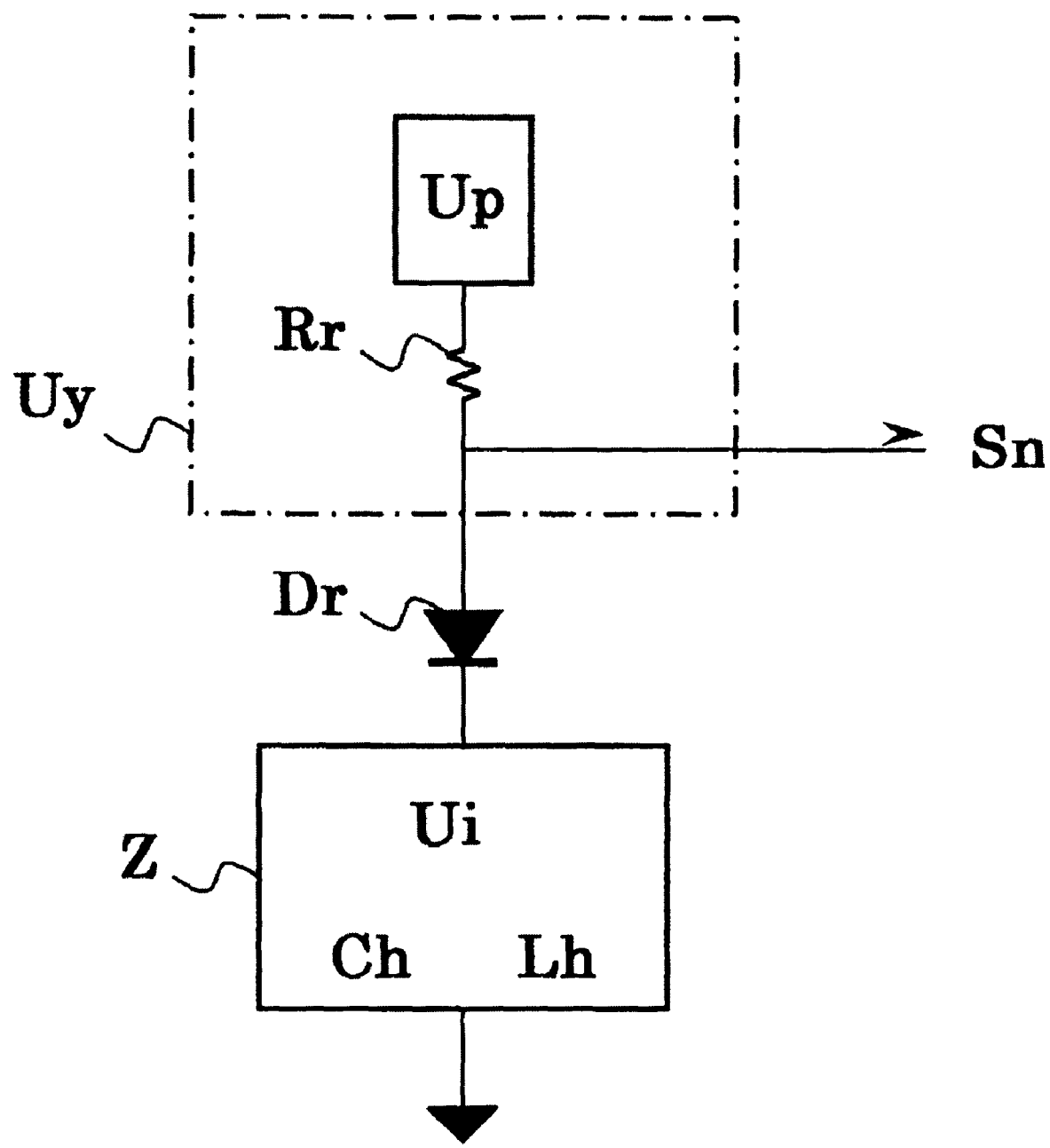
FIG. 2 is an abstract block diagram showing part of an embodiment of a discharge lamp lighting apparatus according to the present invention.

FIG. 2 is an abstract block diagram showing part of an embodiment of a discharge lamp lighting apparatus according to the present invention, wherein the constant voltage power supply (Up) and a load side are shown as an equivalent circuit in a case the power supply circuit (Ux) is in a resting state. In such a case, the inverter (Ui), the resonance inductor (Lh), and the resonant capacitor (Ch) can be treated as a load (Z). In addition, since the discharge lamp (Ld) is in a non-lighting state, it is not included in the above-mentioned load (Z).

Current may flow from the constant voltage power supply (Up) to the load (Z) through the resistor (Rr) and the diode (Dr). The potential at midpoint of the series connection of the resistor (Rr) and the diode (Dr) is monitored as the synchronization degree signal (Sn). When the power consumption of the load (Z) is small, since the current which flows from the constant voltage power supply (Up) is small, voltage drop in the resistor (Rr) is small. Therefore, the potential of the synchronization degree signal (Sn) shows high voltage close to output voltage of the constant voltage power supply (Up). Conversely, when the power consumption of the load (Z) is large, the current that flows from the constant voltage power supply (Up) is large. Therefore, since the voltage drop in the resistor (Rr) is large, the synchronization degree signal (Sn) shows low potential close to the ground potential.

Here, a sweep operation of a frequency of the inverter (Ui), which forms the load (Z), is carried out in a range including the resonance frequency. In this case, electric power consumed depending on the on-resistance of, for example, the switching elements (Q1, Q2, Q3, and Q4), which forms the inverter (Ui), becomes large, as the current flowing therethrough increases. Therefore, since the consumed power of the load (Z) becomes large as the driving frequency of the inverter (Ui) approaches the resonance frequency, it turns out that the potential of the synchronization degree signal (Sn) becomes low.

In this case, although the current is limited by the resistor (Rr) (current limiting resistor) so that the supply capability may become constant in order that the sweep time power supply circuit (Uy) supplies electric power with the constant supply capability, for example, supply current or supply voltage may be limited so as to be constant by the sweep time power supply circuit (Uy). Moreover, it may not be necessarily constant in terms of DC, but it may be a current pulse train or an electric power pulse train, whose average is constant. However, "constant" means that it is not necessary to be strictly constant over the entire sweep range of the driving frequency of the inverter (Ui), but in the range close to the resonance frequency it should be at least constant. In other words, what is necessary is just to detect that synchronization to the resonance frequency is achieved, by finding out the condition where the potential of the input side of the inverter (Ui) decreases most. Thus, under the electric supply condition where the small supply capability is constant, electric power is supplied to the inverter (Ui), and when the driving frequency of the inverter (Ui) is changed while monitoring the potential of the input side of the inverter (Ui), the condition, where the resonant condition is realized, can be accurately found.

It is important that a degree of "smallness" in the electric supply condition where the small supply capability is constant, is an extent to which a breakdown may not occur in the connected discharge lamp (Ld) by generated resonance voltage even when a resonant condition is realized. This is because, as described, if a breakdown occurs in the discharge lamp (Ld), the potential of the input side of the inverter (Ui), which is being monitored, changes irregularly, so that it becomes difficult to get to know the condition where the resonant condition is accurately realized.

Figure 3:
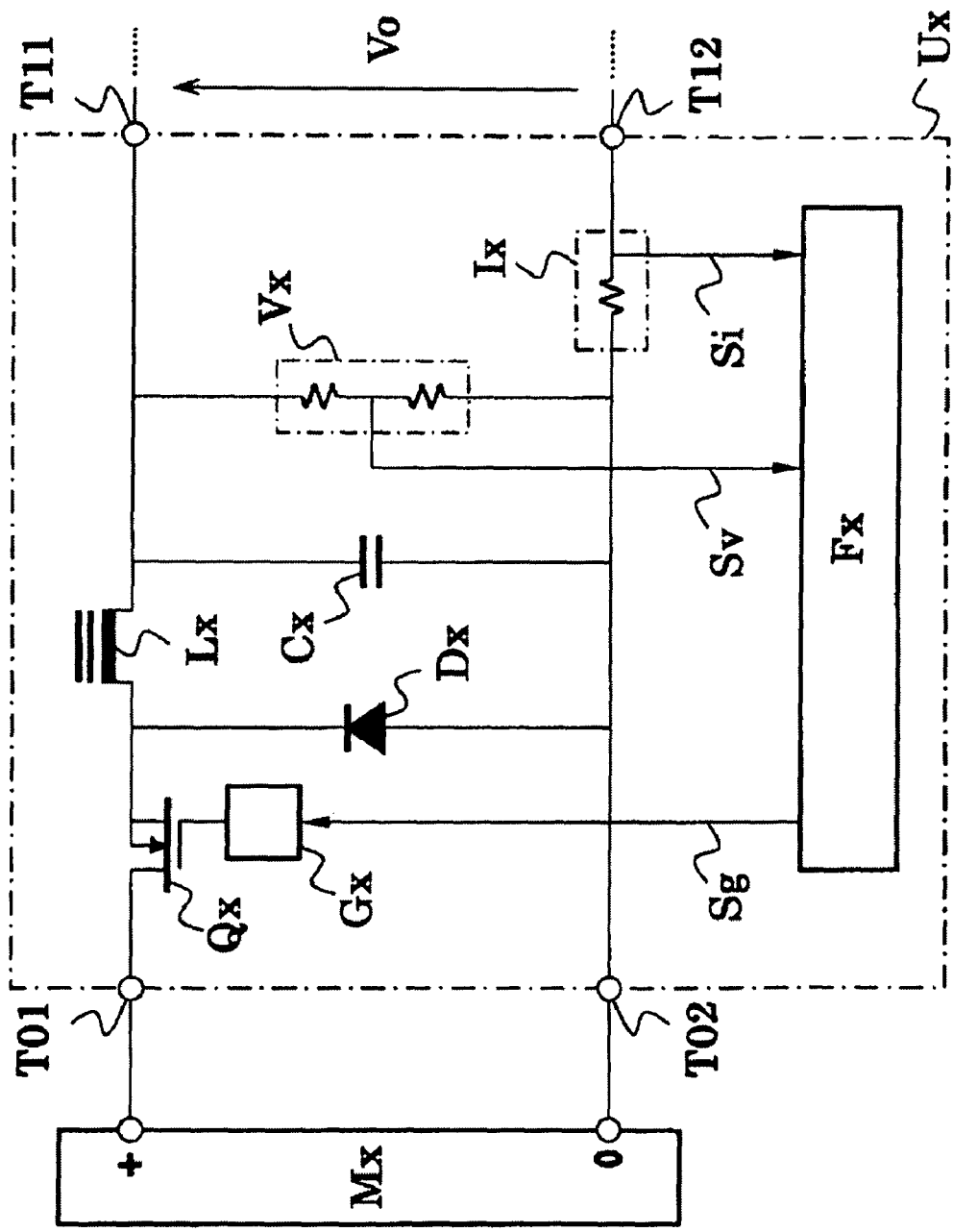
FIG. 3 is a simplified block diagram showing an embodiments of a discharge lamp lighting apparatus according to the present invention.

FIG. 3 shows a concrete example of the power supply circuit (Ux) which can be used in the discharge lamp lighting apparatus according to the present invention. The power supply circuit (Ux) based on a step down chopper circuit is operated in response to supply of voltage from a DC power source (Mx) such as a PFC, etc., and adjusts electric supply to the discharge lamp (Ld). The power supply circuit (Ux) is configured so that current from the DC power source (Mx) is turned on and off by a switching element (Qx) such as FET, so that a smoothing capacitor (Cx) is charged through a choke coil (Lx), and this voltage is applied to the discharge lamp (Ld), thereby passing current through the discharge lamp (Ld).

In addition, while in a period when the switching element (Qx) is in an ON state, the smoothing capacitor (Cx) is directly charged and current is supplied to the discharge lamp (Ld) which is a load, by the current which flows through the switching element (Qx), energy is stored in a choke coil (Lx) in the form of magnetic flux, and in a period when the switching element (Qx) is in an OFF state, the smoothing capacitor (Cx) is charged and current is supplied to the discharge lamp (Ld) through a fly wheel diode (Dx), by the energy stored in the choke coil (Lx) in the form of magnetic flux. In addition, the resting state of the power supply circuit (Ux) shown in FIG. 1, which is explained above in connection with FIG. 2, means a state where the switching element (Qx) stops in an OFF state.

In the step down chopper type power supply circuit (Ux), electric power supply to the discharge lamp can be adjusted by a ratio of a period of an ON state of the switching element (Qx) to an operation cycle of the switching element (Qx), that is, a duty cycle ratio. Here, a gate driving signal (Sg), which has a certain duty cycle ratio, is generated by an electric supply control circuit (Fx), and turning on and off of the current from the DC power source (Mx) is controlled by controlling a gate terminal of the switching element (Qx) through a gate driving circuit (Gx).

Lamp current which flows between the electrodes (E1, E2) of the discharge lamp (Ld) and lamp voltage generated between the electrodes (E1, E2) are respectively detected by an electric supply current detection unit (Ix) and an electric supply voltage detection unit (Vx). In addition, a shunt resistor is used for the electric supply current detection unit (Ix), and the electric supply voltage detection unit (Vx) can be easily realized by using a voltage dividing resistor.

The electric supply current detection signal (Si) from the electric supply current detection unit (Ix) and an electric supply voltage detection signal (Sv) from the electric supply voltage detection unit (Vx) are inputted into the electric supply control circuit (Fx). In the period when lamp current does not flow at start-up time of the lamp, the electric supply control circuit (Fx) generates the gate driving signal (Sg) in a feedback manner so as to output a certain voltage, thereby applying non-load open circuit voltage to the lamp. Moreover, when a lighting operation of the lamp starts and discharge current flows, the electric supply control circuit (Fx) generates the gate driving signal (Sg) in a feedback manner so that target lamp current may be outputted. The target lamp current is based on a value by which electric power applied to the discharge lamp (Ld) turns into a predetermined electric power according to a voltage of the discharge lamp (Ld). However, since the voltage of the discharge lamp (Ld) is low immediately after the start-up, so that rated power cannot be supplied, the target lamp current is controlled so as not to exceed a constant limit value which is called initial limiting current. The voltage of the discharge lamp (Ld) rises with a temperature rise, and if current required for a predetermined electric power application turns into the above-mentioned initial limiting current or smaller, it shifts to a state where the predetermined electric power application can be realized, smoothly.

Figure 4:
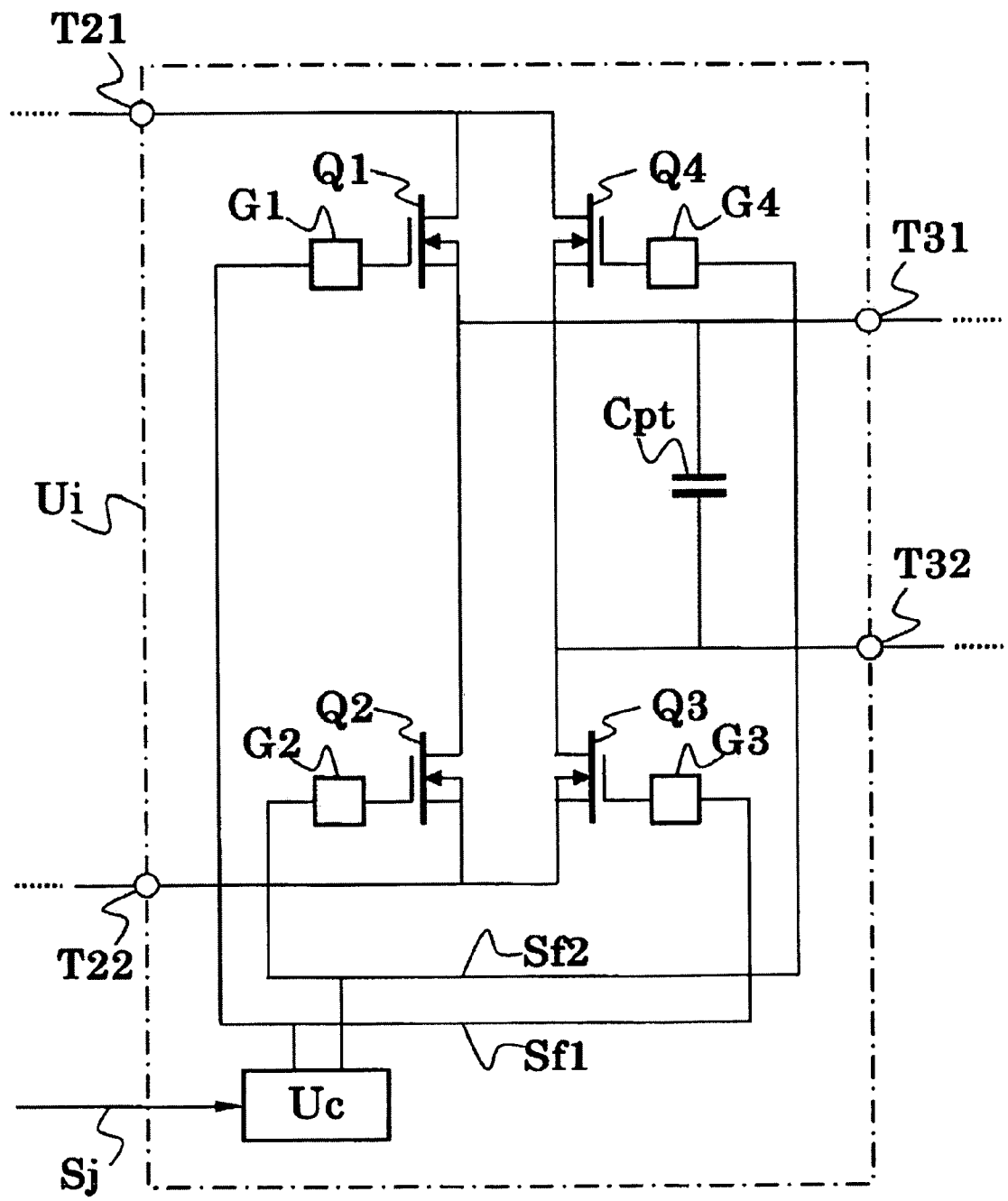
FIG. 4 is a schematic diagram of the structure of part of an embodiment of a discharge lamp lighting apparatus according to the present invention.

FIG. 4 is a schematic diagram showing of an embodiment of an inverter (Ui) which can be used in a discharge lamp lighting apparatus according to the present invention. The inverter (Ui) is configured by a full bridge circuit, using switching elements (Q1, Q2, Q3, and Q4), which is respectively made up of FETs. Each switching element (Q1, Q2, Q3, and Q4) is driven by each gate driving circuit (G1, G2, G3, and G4), and is controlled through the gate driving circuit (G1, G2, G3, and G4) by the inverter control signals (Sf1, Sf2) generated by the inverter driving circuit (Uc) of the inverter so that when the switching element (Q1) and the switching element (Q3), which are in a relationship of diagonal elements are in an ON state, the switching element (Q2) and the switching element (Q4) which are in relationship of diagonal elements are maintained in an OFF state, and conversely, when the switching element (Q2) and the switching element (Q4), which are in relationship of diagonal elements are in an ON state, the switching element (Q1) and the switching element (Q3) are in an OFF state. When the two above-mentioned phases are switched, a period, which is called a dead time in which all the switching elements (Q1, Q2, Q3, and Q4) are turned off, is inserted.

In addition, in a case where the switching elements (Q1, Q2, Q3, and Q4) are MOSFETs, a parasitism diode whose forward direction is from a source terminal toward a drain terminal is built in each element itself (not shown). However, in a case where a bipolar transistor, etc., in which a parasitism diode does not exist, is used therefor, since there is a possibility that the element may be damaged by generation of reverse voltage at the above-mentioned switching time or during the dead time, when induced current resulting from the inductance component, which exists in the downstream side of the inverter (Ui) will flow, it is desirable to connect a diode equivalent to a parasitism diode in reverse-parallel. The switching elements (Q1, Q2, Q3, Q4) are driven by the inverter drive circuit (Uc), which receives the inverter driving signal (Sj) outputted from the periodic driving circuit (Uj).

Figure 5:
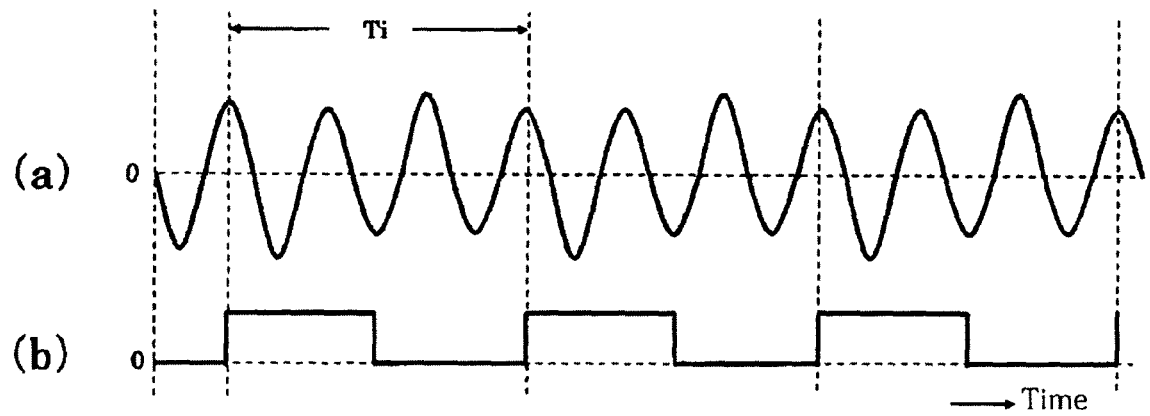
FIG. 5 is a conceptual diagram of waveform of an embodiment of a discharge lamp lighting apparatus according to the present invention.

FIG. 5 is a conceptual diagram of waveform of an embodiment of a discharge lamp lighting apparatus according to the present invention. This figure shows an example in a case where the discharge lamp lighting apparatus shown in FIG. 1 is operated under condition of a third resonance. In the figure, (a) shows a state of voltage between terminals of the resonant capacitor (Ch), and (b) shows a state of the inverter driving signal (Sj). Thus, it turns out that in a period (Ti) of one cycle of the inverter driving signal (Sj), there is vibration including three cycles in the voltage between terminals of the resonant capacitor (Ch). The present invention is not limited to the case of fundamental wave resonance, i.e., a case where the resonance frequency of the resonant circuit (Nh) is the same as the frequency of the inverter (Ui), and may be applied to a case of high order resonance, that is, a case under condition where the frequency of the inverter (Ui) turns into frequency that is one divided by an odd number of the resonance frequency of the resonant circuit (Nh).

Figure 6:
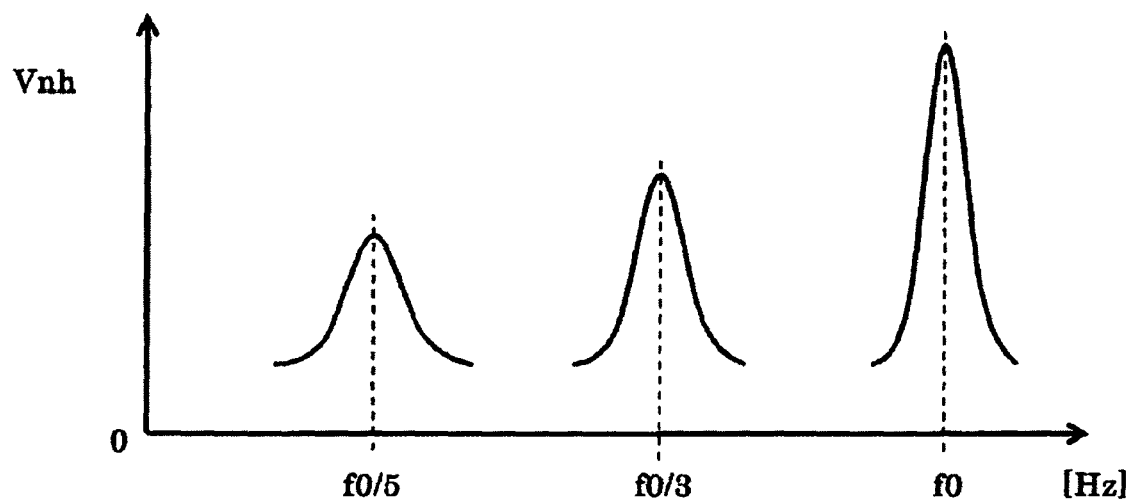
FIG. 6 is a conceptual diagram of waveform of an embodiment of a discharge lamp lighting apparatus according to the present invention.

FIG. 6 is a conceptual diagram showing features in an embodiment of a discharge lamp lighting apparatus according to the present invention. A horizontal axis is driving frequency and a vertical axis is output voltage (Vnh) applied to the discharge lamp (Ld). Although a value of the output voltage (Vnh) tends to decrease as the high order resonance becomes higher from fundamental wave resonance frequency (f0), such as third resonance frequency (f0/3) or fifth resonance frequency (f0/5), a resonant action can be obtained by driving the inverter (Ui) at each oddth resonance frequency.

By driving the inverter (Ui) at the fundamental wave resonance frequency (f0), the strongest resonance is acquired so that high voltage can be expected as the output voltage (Vnh). However, when driving at high fundamental wave resonance frequency (f0) is impossible due to the limit of frequency at which the inverter (Ui) can be operated, that is, restrictions of the driving frequency resulting from the gate capacitance value and gate resistance of the switching element (Q1, Q2, Q3, and Q4), or restrictions of the upper limit frequency of the inverter drive circuit (Uc), these restrictions can be avoided by using the above-mentioned high order resonance.

Figure 7:
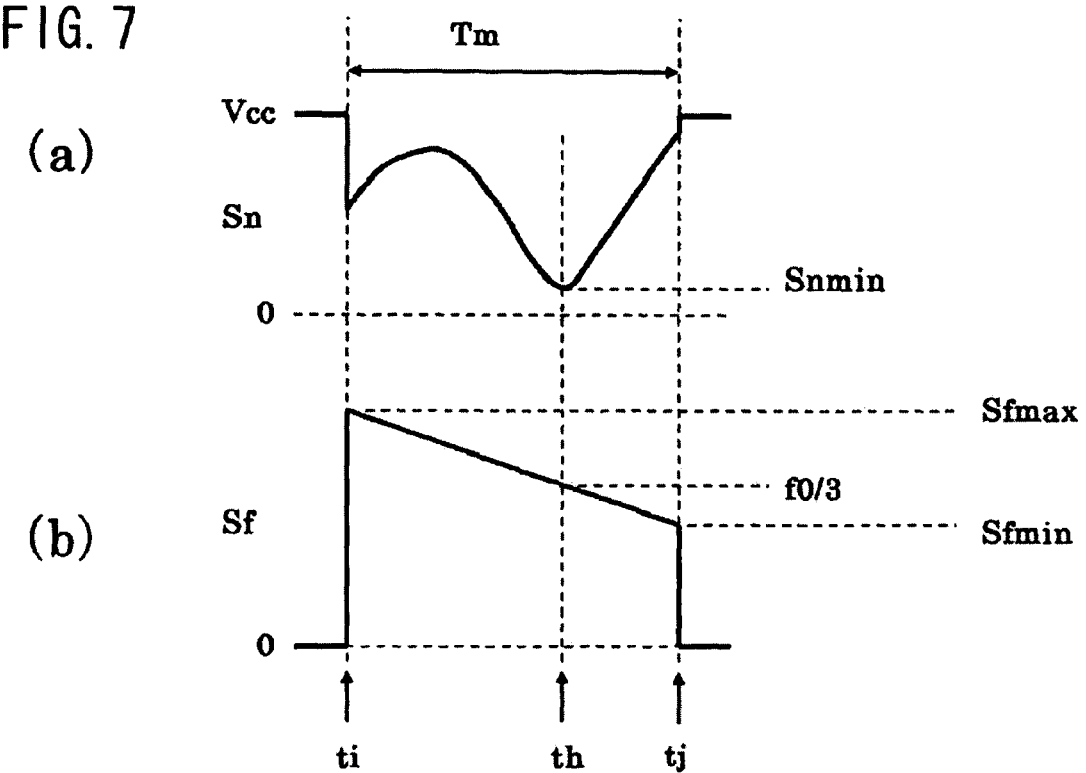
FIG. 7 is a simplified timing diagram of an embodiment of a discharge lamp lighting apparatus according to the present invention.

FIG. 7 is a schematic timing diagram of an embodiment of a discharge lamp lighting apparatus according to the present invention. This figure shows an operation of the discharge lamp lighting apparatus shown in FIG. 1, wherein in order to perform synchronization of the resonant circuit (Nh) of the inverter (Ui), a sequence of detecting the optimal inverter frequency is shown. The frequency control circuit (Uf) first changes the frequency control signal (Sf) between the lower limit and the upper limit, that is, in the sweep operation, the oscillation frequency of the periodic driving circuit (Uj) is swept, starting from the upper limit frequency to lower limit frequency. Of course, the sweep operation may be carried out from the lower limit frequency to the upper limit frequency, and it may be changed continuously or stepwise.

FIG. 7 shows a situation where in a sweep operation, the frequency control signal (Sf) is swept from an upper limit frequency corresponding value (Sfmax) to a lower limit frequency corresponding value (Sfmin), from a time point (ti) to a time point (tj). At this time, the frequency range from the upper limit frequency to the lower limit frequency should be set up, in order to include a range of the manufacturing tolerance in the resonance frequency, corresponding to the assumed manufacturing tolerance of the inductance of the resonance inductor (Lh) and the electrostatic capacity of the resonant capacitor (Ch).

The frequency control circuit (Uf) monitors the synchronization degree signal (Sn) while performing a sweep operation, and formation conditions of the frequency control signal (Sf) are recorded when the signal shows the minimum value (Snmin), that is, at a time point (th). In this way, it is possible to record a state where the driving frequency of the inverter (Ui) is approximately in agreement with resonance conditions (fundamental wave resonance or high order resonance). And after an end of the sweep operation, the frequency control circuit (Uf) reproduces and fixes the formation conditions of the frequency control signal (Sf) at the time when the driving frequency of the inverter (Ui) is approximately in agreement with resonance conditions (fundamental wave resonance or high order resonance).

Incidentally, the figure shows that an operation starts from a state where the synchronization degree signal (Sn) is low, and goes up, when the inverter (Ui) is driven at the upper limit frequency at the time point (ti). The reason therefor will be explained below. Although the upper limit frequency, which is set at the beginning, is first relatively close to fundamental wave resonance frequency, it becomes gradually different from this frequency with the sweep operation. And, the synchronization degree signal (Sn) reaches the maximum with further progress of the sweep operation, and then, the synchronization degree signal (Sn) drops as it approaches the third resonance frequency. The synchronization degree signal (Sn) shows the minimum when it is in approximate agreement with the third resonance frequency at the time point (th). (When the upper limit frequency which is set up at the beginning is far from fundamental wave resonance frequency, the rise or the maximum of the synchronization degree signal (Sn) does not appear).

Incidentally, in the process of the sweep operation, when at the time point (th), the discharge lamp lighting apparatus acquires the synchronization degree signal (Sn), which has a small value, if there is no other information, it is impossible to correctly judge that this is the minimum, until the time point (tj) that is an end of the period (Tm) where the sweep operation is performed in a predetermined frequency range. However, for example, in a case where it is the second or later optimum frequency detection sequence after electricity is applied to the discharge lamp lighting apparatus, if information acquired in the last sequence, such as the formation conditions of the frequency control signal (Sf) and/or a value of the synchronization degree signal (Sn), is used, it is possible to omit the sweep operation in a remaining period of the period (Tm) after the time point (th). Moreover, in the second or later operation, it is possible to narrow a sweep range from the upper frequency to the lower frequency, by using the above-mentioned information.

Namely, when a small value of the synchronization degree signal (Sn) is acquired at the time period (th), or when it is detected that it shifts to a rise slightly, if it is confirmed that the formation conditions of the frequency control signal (Sf) at the time point (th) are close to the formation conditions of the frequency control signal (Sf) acquired in the last sequence, or that it is close to a value of the synchronization degree signal (Sn) acquired in the last sequence, it is possible to determine that the optimal inverter frequency is detected according to the formation conditions of the frequency control signal (Sf) at the time point (th).

As described above, by adopting the structure capable of detecting and setting up the optimal frequency at time when the inverter (Ui) drives the resonant circuit (Nh), according to the embodiment of the present invention in FIG. 1, it is possible to omit the structure such as the above-described output voltage detection unit in the prior art which requires high voltage resistance or the structure of a secondary winding arranged in a resonance inductor, whereby especially there is an advantage in reducing cost. Specifically, by using as the resistor (Rr) a surface mount resistor whose size is 1.6 mm×0.8 mm (1608 sizes), and using as the diode (Dr) a surface mount diode whose size is 2.0 mm×1.2 mm (2012 sizes), it is possible to realize a circuit for detecting the optimal frequency at a time of driving the resonant circuit (Nh) with low cost.

Figure 8:
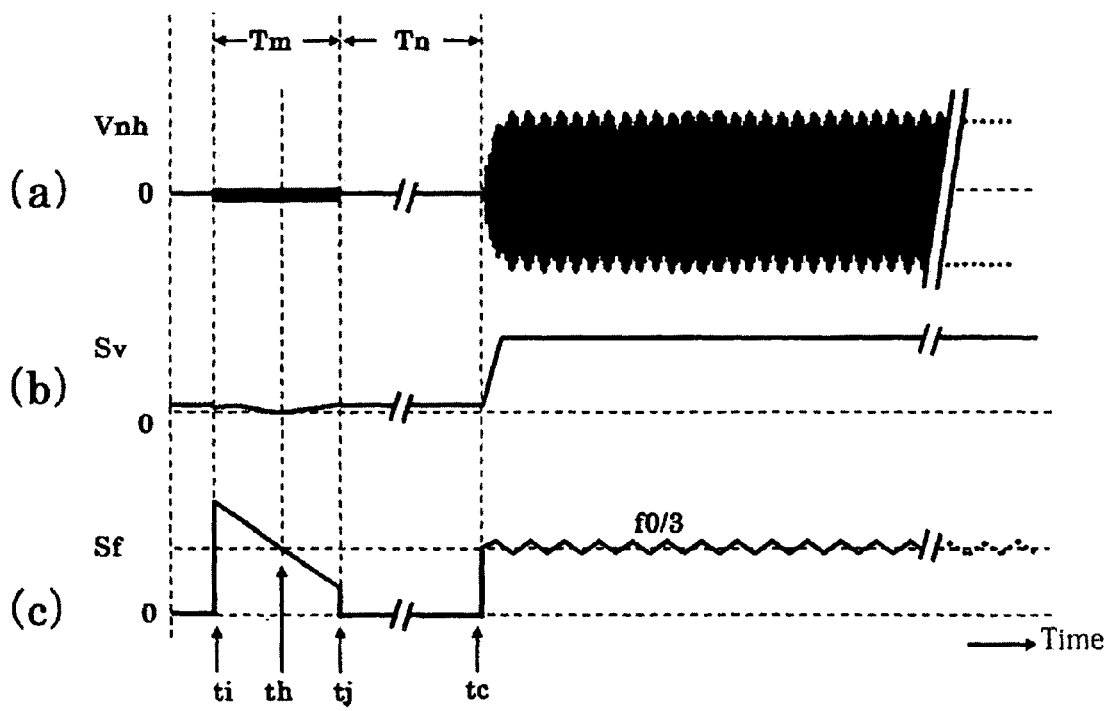
FIG. 8 is a simplified timing diagram of an embodiment of a discharge lamp lighting apparatus according to the present invention.

Referring to FIG. 8 which is a schematic timing diagram of an embodiment of a discharge lamp lighting apparatus according to the present invention, description thereof will be given below. In the figure, (a) shows a waveform of voltage (Vnh) which is generated in the resonant circuit (Nh), (b) shows a waveform of an electric supply voltage detection signal (Sv), and (c) shows a waveform of the frequency control signal (Sf). In the figure, an operation of the discharge lamp lighting apparatus in the sweep operation period (Tm) is the same as that described above in relation to FIG. 7. In order to generate intense resonance phenomena in the resonant circuit (Nh), it is necessary to accurately determine a frequency control signal (Sf). However, according to a time delay due to restrictions about evaluation processing of the synchronization degree signal (Sn) and the resolution of the frequency control circuit (Uf), etc., the frequency control signal (Sf) may be determined so as to be slightly out of the optimal value. Furthermore, even after the frequency control signal (Sf) is determined, these circuit elements generate heat by passing current through the resonant circuit (Nh) made up of the resonance inductor (Lh) and the resonant capacitor (Ch), so that the inductance and/or electrostatic capacity of these circuit elements changes and resonance frequency changes (drifts), whereby the determined frequency control signal (Sf) may be slightly out of the optimal value.

Figure 19:
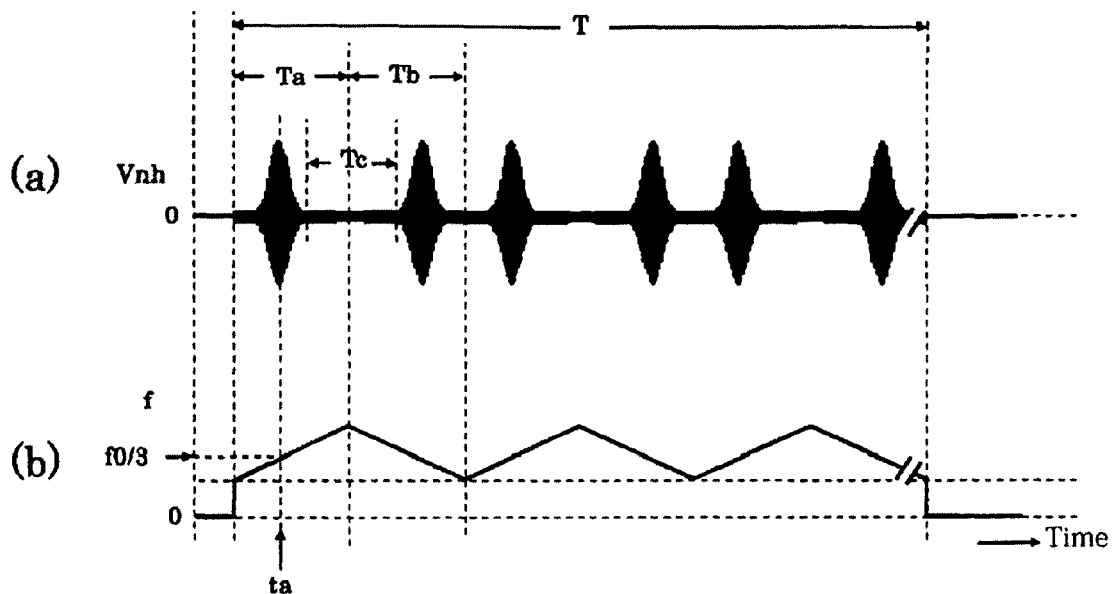
FIG. 19 is a simplified timing diagram of one form of a conventional discharge lamp lighting apparatus.
Figure 20:
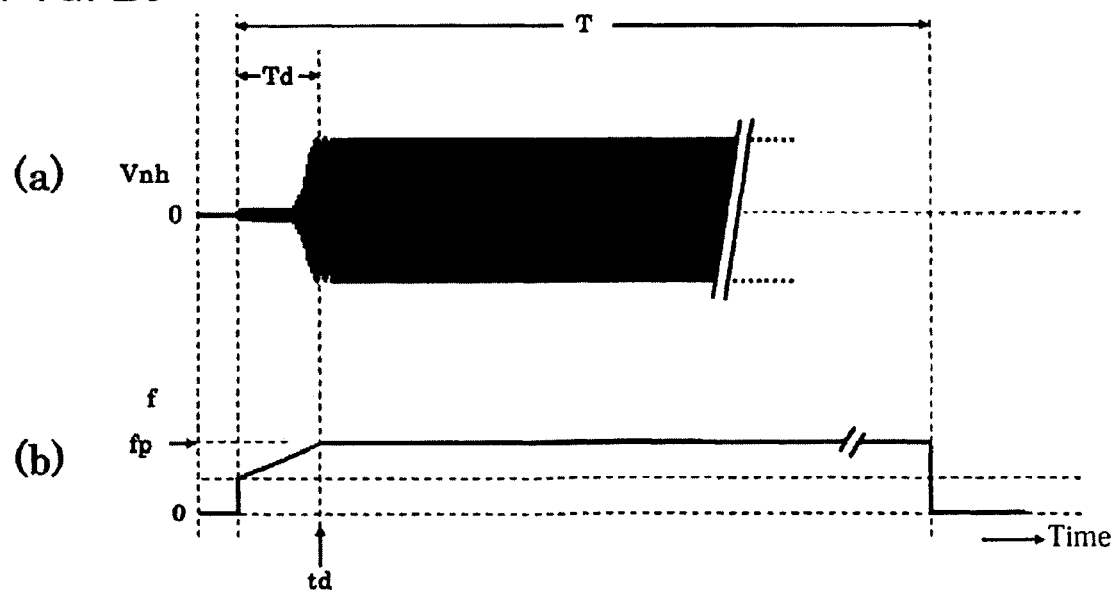
FIG. 20 is a simplified timing diagram of one form of a conventional discharge lamp lighting apparatus.

In order to avoid such a phenomenon, after the sweep operation at the period (Tm) is ended thereby determining the optimal value of the frequency control signal (Sf), it is effective to continue a frequency control signal fluctuation operation (operation which continuously raises and decreases the frequency control signal (Sf)), in a narrow range including the optimal value of the determined frequency control signal (Sf). Thus, in such a way, even if a value of the determined frequency control signal (Sf) is slightly out of the optimal value or resonance frequency changes, the optimal frequency control signal (Sf) is frequently surely realized by continuing the sweep operation in the narrow range including the frequency control signal (Sf), and also since the amount of shift is small in a period during which it is out of the optimal frequency control signal (Sf), as shown in (a) of FIG. 19, a drop of the voltage, which is harmful to resonance starting of the discharge lamp (Ld), is not caused.

Even if there is an error in the value of the frequency control signal (Sf) corresponding to the resonance frequency of the resonant circuit (Nh), which has been determined by the sweep operation, or even if there is a drift of the resonance frequency due to a temperature change of the resonance circuit elements, a sufficient rise of voltage applied to the lamp can be secured. Furthermore, in a case where the discharge lamp (Ld) starts electric discharge by high voltage of the resonant circuit (Nh), even when electric discharge of the discharge lamp (Ld) goes out after progressing to the following step in a lighting sequence, for example, a step of waiting for a shift from glow discharge to arc discharge, since the optimal value of the frequency control signal (Sf) is recorded, it can immediately return to a state where high voltage is applied to the lamp again by generating a resonance phenomena in the resonant circuit, and since such an operation can be repeated a number of times, it is possible to remarkably reduce a probability of a lighting failure.

FIG. 8 shows an interval period (Tn) between the time point (tj) that is an end of the period (Tm) of the optimum frequency detection sequence for determining the value of the frequency control signal (Sf), and the time point (tc) at which an output of the output voltage (Vnh) starts. The length or existence of the period (Tn) may be set up according to a use condition of the discharge lamp lighting apparatus. For example, in a case where the optimum frequency detection sequence described above, is inserted every lamp lighting, the interval period (Tn) is shortened very much or can be omitted if not necessary (what is necessary is just to make the length of the period (Tn) into zero).

After the above-described optimum frequency detection sequence is performed at a time when electricity is applied to the discharge lamp lighting apparatus and formation conditions of the frequency control signal (Sf) are recorded, for example, where the formation conditions of the recorded frequency control signal (Sf) are reproduced and applied thereto before starting a lamp lighting sequence upon receiving a lamp lighting command from a main body of a projector that includes the discharge lamp lighting apparatus therein-side, it is possible to save time by a period which is equivalent to the period (Tm) of the optimum frequency detection sequence, after receiving the lamp lighting command described above, to a period in which the lamp is actually lighted. In this case, the above-described interval period (Tn) becomes long. However, if this period becomes too long, for example, a temperature change arises during that period so that the above-described drift of the resonance frequency becomes too large. As a result, there is a problem that a difference between the driving frequency of the inverter (Ui) and the resonance frequency becomes too large, so that a rise of the voltage due to the resonance becomes insufficient. Therefore, for example the above-described optimum frequency detection sequence is performed whenever a predetermined interval period lapses, thereby, for example, updating the formation conditions of the frequency control signal (Sf) in the memory. Or in a case of starting a lamp lighting sequence after a predetermined interval period or more lapses, it is desirable to perform the optimum frequency detection sequence just before that.

Figure 9:
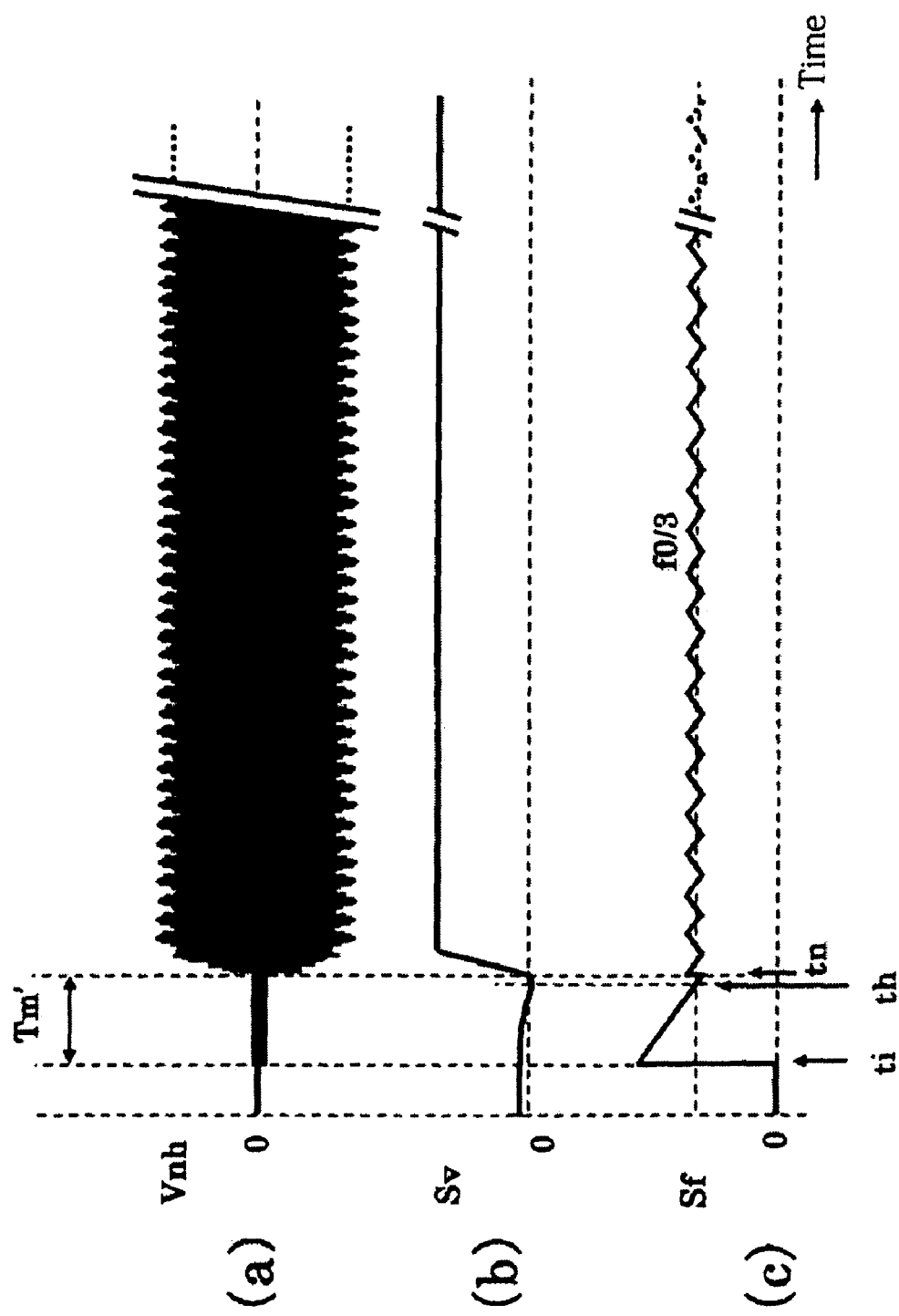
FIG. 9 is a simplified timing diagram of an embodiment of a discharge lamp lighting apparatus according to the present invention.

As described above, in the case where the optimum frequency detection sequence that is described above, is inserted every time lamp is turned on, the interval period (Tn) may not be needed. Therefore, it is possible to save time by omitting the period (Tn). Furthermore, as described above referring to FIG. 7, in a case where the optimum frequency detection sequence is performed for the second time or later after electricity is applied to the discharge lamp lighting apparatus, it is possible to omit the sweep operation in the remainder of the period (Tm) after the time point (th), by using the information on the formation conditions of the frequency control signal (Sf) or the value of the synchronization degree signal (Sn) acquired in the last sequence. FIG. 9 shows such an operation of the discharge lamp lighting apparatus. At the time point (tn) after the time point (th), it is determined that the optimum frequency is detected by using the information acquired in the last optimum frequency detection sequence, and immediately thereafter, it is possible to start to output voltage (Vnh).

Figure 10:
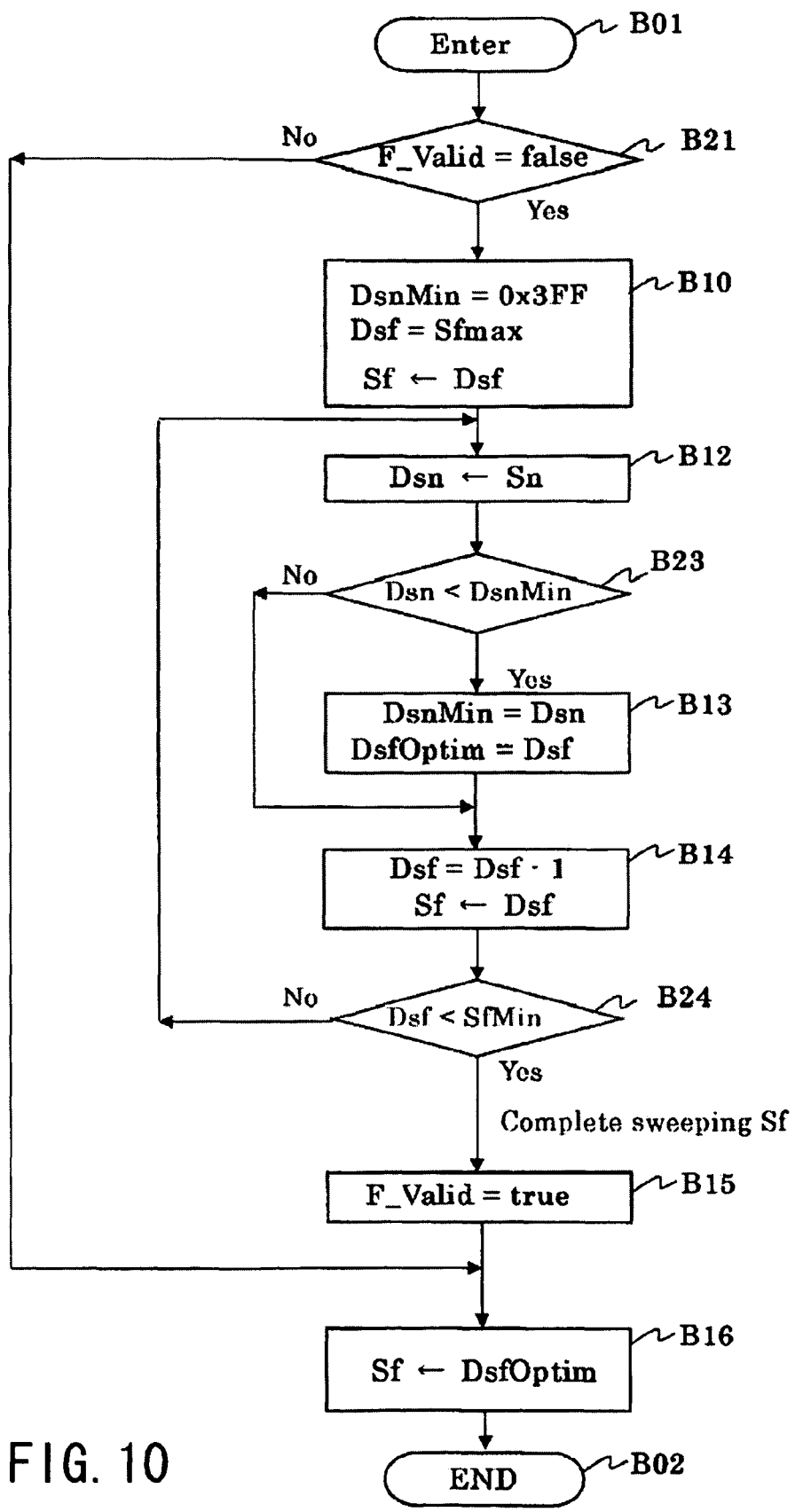
FIG. 10 is a simplified flow chart of an embodiment of a discharge lamp lighting apparatus according to the present invention.

FIG. 10 is a schematic flow chart of an embodiment of a discharge lamp lighting apparatus according to the present invention. Specifically, the figure shows an example of a flow chart of a microprocessor program as to part of the operation, which is explained referring to FIG. 7, in a case where the frequency control circuit (Uf) is configured by using a microprocessor unit. Description of the embodiment will be given below.

A synchronization degree signal variable (Dsn) is a variable for temporarily storing a value that is obtained by carrying out A/D conversion of the synchronization degree signal (Sn). A minimum synchronization degree signal variable (DsnMin) is a variable for temporarily storing a value which is the lowest in the synchronization degree signal (Sn) acquired in a loop from a processing block (B12) to a processing block (B24), which is described below, during execution of the optimum frequency detection sequence. A frequency control signal variable (Dsf) is a variable for temporarily storing a value for setting up the frequency control signal (Sf). A frequency control optimum value variable (DsfOptim) is a variable for storing a candidate of the most suitable value for setting up the frequency control signal (Sf). In addition, when the frequency control signal (Sf) is an analog signal, D/A conversion of the frequency control signal variable (Dsf) or the frequency control optimum value variable (DsfOptim) is carried so as to be outputted therefrom.

A detection completion flag (F_Valid) is a flag showing that the optimum frequency detection sequence is completed. When this flag is false, although the subsequent optimum frequency detection sequences are performed according to judgment in the processing block (B21), when it is true, since the formation conditions of the frequency control signal (Sf) are stored, the optimum frequency detection sequence is not performed but the output voltage (Vnh) starts to be outputted promptly.

In a processing block (B10), default setting before execution of an optimum frequency detection sequence is performed. The minimum synchronization degree signal variable (DsnMin) is set to the maximum, which may be acquired as the synchronization degree signal variable (Dsn), or greater. For example, the value is 1023 when data width therefor in a case A/D conversion of the synchronization degree signal (Sn) is carried out is 10 bits, or the value is set to 65535 when the data width of the synchronization degree signal variable (Dsn) is 16 bits. Moreover, an upper limit frequency corresponding value (Sfmax) of the driving frequency for performing a sweep operation is set as the frequency control signal variable (Dsf).

Next, in a processing block (B12), the synchronization degree signal (Sn) is retrieved as data, and stored as a value of the synchronization degree signal variable (Dsn). Since the upper limit frequency corresponding value (Sfmax) is set to the frequency control signal (Sf) immediately after the default setting in the processing block (B10), the inverter (Ui) is operated at the upper limit frequency, and at that time, the synchronization degree signal (Sn) is retrieved. Whenever a sweep operation is carried out by updating the driving frequency of the inverter (Ui) in the processing block (B14) that is described below, and every time it returns to the processing block (B12), the synchronization degree signal (Sn) is retrieved, and saved as a value off the synchronization degree signal variable (Dsn).

In a processing block (B23), it is judged whether the value is lower than the minimum synchronization degree signal variable (DsnMin) which the synchronization degree signal variable (Dsn) has acquired previously, if so, while a processing block (B13) is performed and the present synchronization degree signal variable (Dsn) is saved as the minimum synchronization degree signal variable (DsnMin), the present frequency control signal variable (Dsf) is saved as a frequency control optimum value variable (DsfOptim). If such is not the case, the processing block (B13) is not performed.

In a processing block (B14), a frequency control signal variable (DSf) is reduced and set to the frequency control signal (Sf), so as to perform a sweep operation from the upper limit frequency corresponding value (Sfmax) to the lower limit frequency corresponding value (Sfmin). Thereby, the driving frequency of the inverter (Ui) is updated. In a processing block (B24), it is judged whether the frequency control signal variable (DSf) reaches the lower limit frequency corresponding value (Sfmin). If so, it is determined that the sweep operation is completed, and the process proceeds to a processing block (B15). If not, the process returns to the processing block (B12), and the sweep operation continues.

In the processing block (B15), the detection completion flag (F_Valid) showing completion of the optimum frequency detection sequence is set to "true." At this time, it means that it is determined that the value of the frequency control optimum value variable (DsfOptim) saved in the last execution of the processing block (B13) is the optimal value corresponding to the driving frequency of the inverter (Ui). In the processing block (B16) after completing the optimum frequency detection sequence, the detected optimal frequency control optimum value variable (DsfOptim) is set as the frequency control signal (Sf), and the driving frequency of the inverter (Ui) is set to the optimal frequency. When the process leaves this routine, the output voltage (Vnh) is outputted from the power supply circuit and it is shifted to the following lighting starting sequence.

FIG. 11 is a simplified block diagram of an embodiment of a discharge lamp lighting apparatus according to the present invention. Although the synchronization degree signal (Sn) is obtained from the series circuit of the resistor (Rr) and the diode (Dr) in the embodiment of the above-mentioned FIG. 1, in the embodiment of FIG. 11, an electric supply voltage detection unit (Vx) in a power supply circuit (Ux) serves also as a synchronization degree detection unit (Un), and an electric supply voltage detection signal (Sv) serves as the synchronization degree signal (Sn). As explained in relation to FIG. 2 or FIG. 7, in the optimum frequency detection sequence, a phenomenon is detected, in which, as the driving frequency of the inverter (Ui) approaches the resonance frequency, the potential of the node (T21) of the voltage input of the inverter (Ui) becomes low, so that the potential of the synchronization degree signal (Sn) becomes low. However, in order to obtain the similar result, instead of detection of the synchronization degree signal (Sn), it is possible to detect a phenomenon in which the potential of the electric supply voltage detection signal (Sv) corresponding to the output voltage of the power supply circuit (Ux), which is equivalent to input voltage of the inverter (Ui), becomes low.

In a case where the electric supply control circuit (Fx), the frequency control circuit (Uf), the periodic driving circuit (Uj), etc., are joined together using a microprocessor and a digital signal processor, so as to form an integrated signal processing and control circuit, as in the embodiment of FIG. 11, when, instead of inputting the electric supply voltage detection signal (Sv) and the synchronization degree signal (Sn) as separate signals into the signal processing and control circuit, rather the signals are inputted as a single signal (which is ND-converted) in the signal processing and control circuit, in which a section thereof having a function for realizing a process such as lamp power control, and a section thereof having a function for realizing a process of the optimum frequency detection sequence, respectively use the single signal, it is advantageous in terms of reducing cost since it is possible to save resources of elements, such as signal input control ports, and ND conversion channels, etc.

As described above, since a voltage that the power supply circuit (Ux) generates is much higher than a voltage that the constant voltage power supply (Up) generates, so that the signal dynamic range of the electric supply voltage detection signal (Sv) is larger than that of the synchronization degree signal (Sn) shown in the FIG. 1, the dynamic range, which is matched up therewith, is required in a system for measuring this. Conversely, depending on specification of the microprocessor or the digital signal processor which forms discharge lamp lighting apparatus, when the dynamic range of the electric supply voltage detection signal (Sv) cannot be secured sufficiently to detect synchronization of the driving frequency of the inverter (Ui) to the resonance frequency, the embodiment of FIG. 1 becomes advantageous.

FIG. 12 is a simplified block diagram of an embodiment of a discharge lamp lighting apparatus according to the present invention. In the embodiment of FIG. 11, the above-mentioned inverter (Ui) is operated by receiving electric power with constant electric supply capability from the control circuit DC power source (Vcc), which serves as the constant voltage power supply (Up). In the embodiment of FIG. 12, electric power supply from the constant voltage power supply (Up) through the resistor (Rr) is not carried out, and at least in a period of a sweep operation of the inverter (Ui) in the optimum frequency detection sequence, the power supply circuit (Ux) is operated with constant electric supply capability.

In addition, as a method of realizing an operation with constant electric supply capability of the power supply circuit (Ux), most simply put, for example, a gate driving signal (Sg) is generated by performing control so that the duty cycle ratio of the switching element (Qx) forming the power supply circuit (Ux) becomes approximately constant, or the gate driving signal (Sg) is generated by performing control so that the output current of the power supply circuit (Ux) becomes approximately constant. Thus, since during the operation, the inverter (Ui) is configured so that the power supply circuit (Ux) may carry out an operation of constant electric supply capability, similarly to that explained in relation to the FIG. 2 or FIG. 7, in the optimum frequency detection sequence, it becomes possible to detect the optimum frequency by detecting a phenomenon in which as the driving frequency of the inverter (Ui) approaches the resonance frequency, the potential of the node (T21) of the voltage input of the inverter (Ui) becomes low, so that the potential of the electric supply voltage detection signal (Sv) becomes low.

When the duty cycle ratio of the switching element (Qx) described above, is controlled so as to be approximately constant, or the output current of the power supply circuit (Ux) is controlled so as to be approximately constant, for example, the electric supply voltage detection signal (Sv) is monitored, and this voltage should be relatively low so as to correspond to that of the control circuit DC power source (Vcc), in particular, as described above in relation to the FIG. 2, so as not generate high resonance voltage at which a breakdown occurs in the discharge lamp (Ld) connected thereto, whereby it does not exceed predetermined voltage. And if this voltage exceeds the predetermined voltage, it should be configured so that formation of the gate driving signal (Sg) may be suspended.

Figure 13:
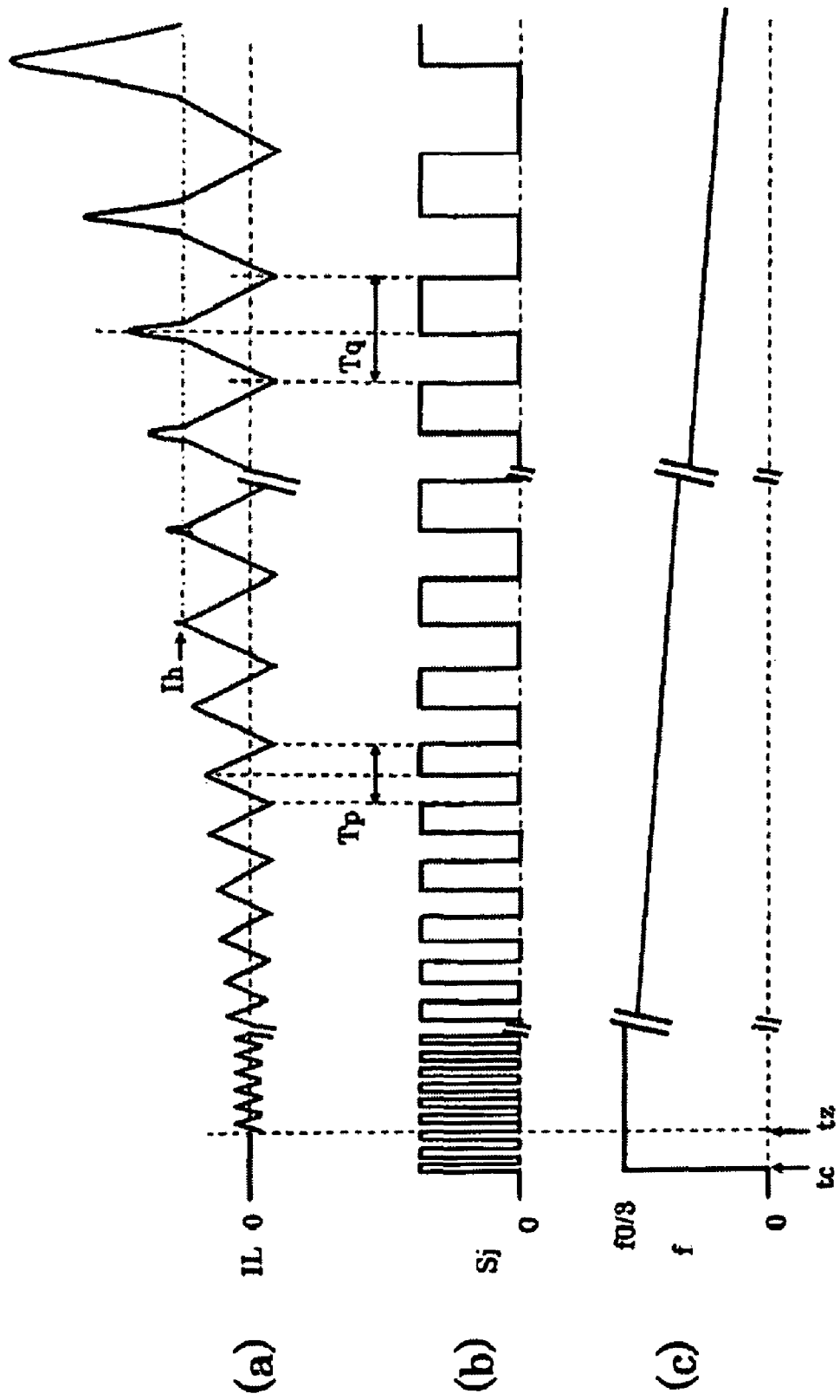
FIG. 13 is a simplified timing diagram of an embodiment of a discharge lamp lighting apparatus relating to the present invention.

FIG. 13 is a simplified timing diagram of an embodiment of a discharge lamp lighting apparatus relating to the present invention. Description of the embodiment will be given below. This figure shows an example of a waveform that may be observed in an starting sequence adjustment stage at a time when the discharge lamp lighting apparatus shown in FIG. 1 is operated under a condition of a third resonance, and the discharge lamp (Ld) is started by resonance starting, etc., wherein (a) shows a waveform of lamp current (IL) that flows through the discharge lamp (Ld), (b) shows a waveform of the inverter driving signal (Sj), and (c) shows a situation of change of frequency (f) of the inverter (Ui). In addition, FIG. 13 shows an operation after the time point (tc) shown in FIG. 8. However, in the narrow range including the optimal value of the frequency control signal (Sf) which is explained in relation to the above-mentioned FIG. 8, the operation in which the frequency control signal (Sf) is fluctuated is omitted.

At a time point (tz), a breakdown occurs in the discharge lamp (Ld) due to resonance starting, so that current starts to flow through the discharge lamp (Ld). Although an asymmetrical electric discharge phenomenon in which current flows only in one side direction of the discharge lamp electrode, and glow discharge occurs after the breakdown, the voltage between both electrodes of the lamp turns into voltage peculiar to the discharge state of the lamp, just like a zener diode, during which the glow discharge occurs. Moreover, since electric power is consumed in the lamp, the Q factor of the resonant circuit (Nh) becomes very low, so that a rise of the voltage due to the resonance is hardly generated.

FIG. 13 shows a state where the discharge lamp (Ld) is in a state of the asymmetrical electric discharge, wherein in (a) of the figure, as an example, much lamp current (IL) flows in a forward direction and little current flows in a negative direction thereof. Such a waveform tends to be observed when arc discharge arises in the forward direction of the lamp current (IL) and glow discharge arises in the negative direction thereof. Since in the period of glow discharge, the lamp voltage is high even if the lamp current is small, a cation is accelerated by high energy in the electrical discharge space of the lamp thereby colliding with the cathode electrode of the lamp. Therefore, if glow discharge continues over a long period of time, since electrode material such as tungsten is discharged into an electric discharge space due to sputtering, there is a problem in which a blackening phenomenon of the lamp, in which the material adheres to an inner surface of a lamp bulb, occurs. Therefore, in the period of such an asymmetrical electric discharge, it is advantageous to facilitate heating of the electrode by passing much lamp current therethrough, thereby make it shift to arc discharge from glow discharge early.

At least at an early stage of the starting sequence of the lamp, etc., shown in FIG. 13, it is necessary to maintain a control state in which the above described non-load open circuit voltage (Vop), i.e., voltage which is typically approximately 200 V, can be outputted from the power supply circuit (Ux). This is because glow discharge of the lamp needs to be maintainable. As described above, although there is a problem in which the blackening phenomenon of a lamp occurs, if glow discharge continues over a long period of time, if glow discharge cannot even be maintained, discharge current stops flowing so that the lamp goes out. Further, when the driving frequency of the inverter (Ui) is 100 kHz, since this is a high frequency wave, the impedance of the resonance inductor (Lh) also becomes high, so that, in order to shift to and maintain arc discharge, the above mentioned level of voltage is required as a voltage applied to the series connection of the discharge lamp (Ld) and the resonance inductor (Lh).

As described above, it is advantageous to make the discharge shift from glow discharge to arc discharge early. As a means therefor, for example, non-load open circuit voltage may be increased, so as to increase power applied to the lamp at time of glow discharge. However, in order that this method may be realizable, an element with the high voltage resistance which is equivalent to the high non-load open circuit voltage to be applied, as the switching elements (Q1, Q2, Q3, Q4) of the inverter (Ui) is needed, so that it is not advantageous in reducing the cost.

Therefore, it turns out that it is necessary to make the high impedance of the resonance inductor (Lh) low, as another means, in order to pass much lamp current therethrough so as to facilitate heating of an electrode in a period of asymmetrical electric discharge, thereby making the discharge shift to arc discharge early from glow discharge. First of all, after the starting sequence of a lamp is completed, the driving frequency of the inverter (Ui) is eventually shifted to low frequency of approximately 50 Hz-400 Hz, which is a frequency at a time of stable lighting of the discharge lamp (Ld). Therefore, when the shifting to the low frequency is completed, the problem that the impedance of the resonance inductor (Lh) is high may be solved naturally.

However, when the driving frequency of the inverter (Ui) is suddenly changed from the high frequency wave at resonance start-up time, which is, for example, approximately 100 kHz, to the above described low frequency, excess rush current may flow through the discharge lamp (Ld). Since the impedance of the resonance inductor (Lh) decreases rapidly with rapid decrease of the frequency of the inverter (Ui), and since the impedance of the discharge lamp (Ld) itself decreases as a result of the rush current which flows through the discharge lamp (Ld), the control of the power supply circuit (Ux) becomes unable to follow it, so that an increase in a positive feedback manner of the current that flows through the discharge lamp (Ld), occurs instantaneously, so that there is a problem of a possibility of damaging the discharge lamp (Ld), the switching elements (Q1, Q2, Q3, Q4) of the inverter (Ui) or the switching element (Qx) of the power supply circuit (Ux), etc.

Moreover, if heating of one of the electrodes (E1, E2) in which arc discharge does not occur in a cycle of a cathode is not facilitated so as to start thermionic emission in a state of the asymmetrical electric discharge in the discharge lamp (Ld), the state of asymmetrical electric discharge cannot be changed. In such a state, a half cycle at which the power applied to the lamp is large and a half cycle at which the power applied thereto is small are repeated in one cycle of an alternating current drive of the inverter (Ui). In a period of the half cycle at which the power applied to the lamp is small, the temperature of an electrode, which has not started thermionic emission, drops. Since a period of each half cycle becomes long suddenly if the driving frequency of the inverter (Ui) is suddenly shifted to a low frequency while the state of asymmetrical electric discharge has not been eliminated, the temperature of the electrode in the side in which thermionic emission has not started, drops excessively, in the lengthen period of the half cycle at which the small power applied to the lamp is small, so that there is a high possibility that the discharge lamp (Ld) may not maintain electric discharge so that the lamp goes out.

When what is described above is reconsidered, it turns out that before the driving frequency of the inverter (Ui) is shifted to the low frequency at time of ultimate stable lighting of the discharge lamp (Ld) in a starting sequence of the lamp, it is necessary to include a step of gradually, but not rapidly, reducing the frequency from a high frequency wave at resonance start-up time, so as to ultimately shift it to a low frequency.

As shown in FIG. 13, after a breakdown occurs in the discharge lamp (Ld) so that current begins to flow through the discharge lamp (Ld), from a time point (tz), the frequency control signal (Sf) is continuously reduced, and the inverter (Ui) is operated so that a cycle of a polarity reversal of the inverter (Ui) may be gradually made longer. As shown in the figure, a waveform of the lamp current (IL) of (a), is a sawtooth-like waveform which is synchronized with the inverter driving signal (Sj) of (b) so that integration of the signal (Sj) is performed. A current waveform in a typical period (TP) therewithin will be briefly described below.

In the lamp current (IL) of (a) in the figure, a positive side (an upper side of the figure) corresponds a direction in which arc discharge occurs. For example, when input voltage of the inverter (Ui), i.e., output voltage of the power supply circuit (Ux) is 200 V and arc discharge voltage of the discharge lamp (Ld) is 20 V, the lamp current (IL) increases at speed which is computed by dividing voltage difference between 200 V and 20 V, which is voltage applied to the resonance inductor (Lh), by the inductance value of the resonance inductor (Lh). Since the arc discharge voltage is sufficiently smaller than the output voltage of the power supply circuit (Ux), a peak value of the sawtooth-like waveform of the lamp current (IL) is approximately proportional to the output voltage of the power supply circuit (Ux), and also proportional to a period of a half cycle of the inverter (Ui). Therefore, if the output voltage of the power supply circuit (Ux) increases, the maximum value of the lamp current (IL) also increases, and if a cycle of the inverter (Ui) increases, the maximum value of the lamp current (IL) also increases.

When in the inverter (Ui), in a half cycle at which current flows in a positive direction of the figure, the lamp current (IL) is increased, while accumulating magnetic energy in the resonance inductor (Lh), so that current flows from the inverter (Ui) to the discharge lamp through the resonance inductor (Lh), and if the polarity of the inverter (Ui) is reversed, while the magnetic energy accumulated in the resonance inductor (Lh) is released, the lamp current (IL) decreases. Thus, such operations are repeated by turns. Thus, since the maximum current value of the lamp current (IL) can be gradually increased by continuously reducing the driving frequency of the inverter (Ui) toward low frequency, heating of one of the electrodes in which arc discharge does not occur in a cycle of a cathode, is facilitated so as to start thermionic emission, whereby a state of asymmetrical electric discharge can be eliminated, and therefore light-out of the lamp can be prevented.

However, in a period (Tq) of this figure, the waveform of the lamp current (IL) is different from the ideal sawtooth-like waveform in the period (Tp), wherein excessive current flows near the peak thereof, and moreover, the lower the driving frequency of the inverter (Ui) is, the larger the excessive current is. This is because the lamp current (IL) exceeds a saturation limiting current value (Ih) of the resonance inductor (Lh), wherein the lower the driving frequency of the inverter (Ui), the longer the period during which it exceeds the saturation limiting current value (Ih).

Figure 14:
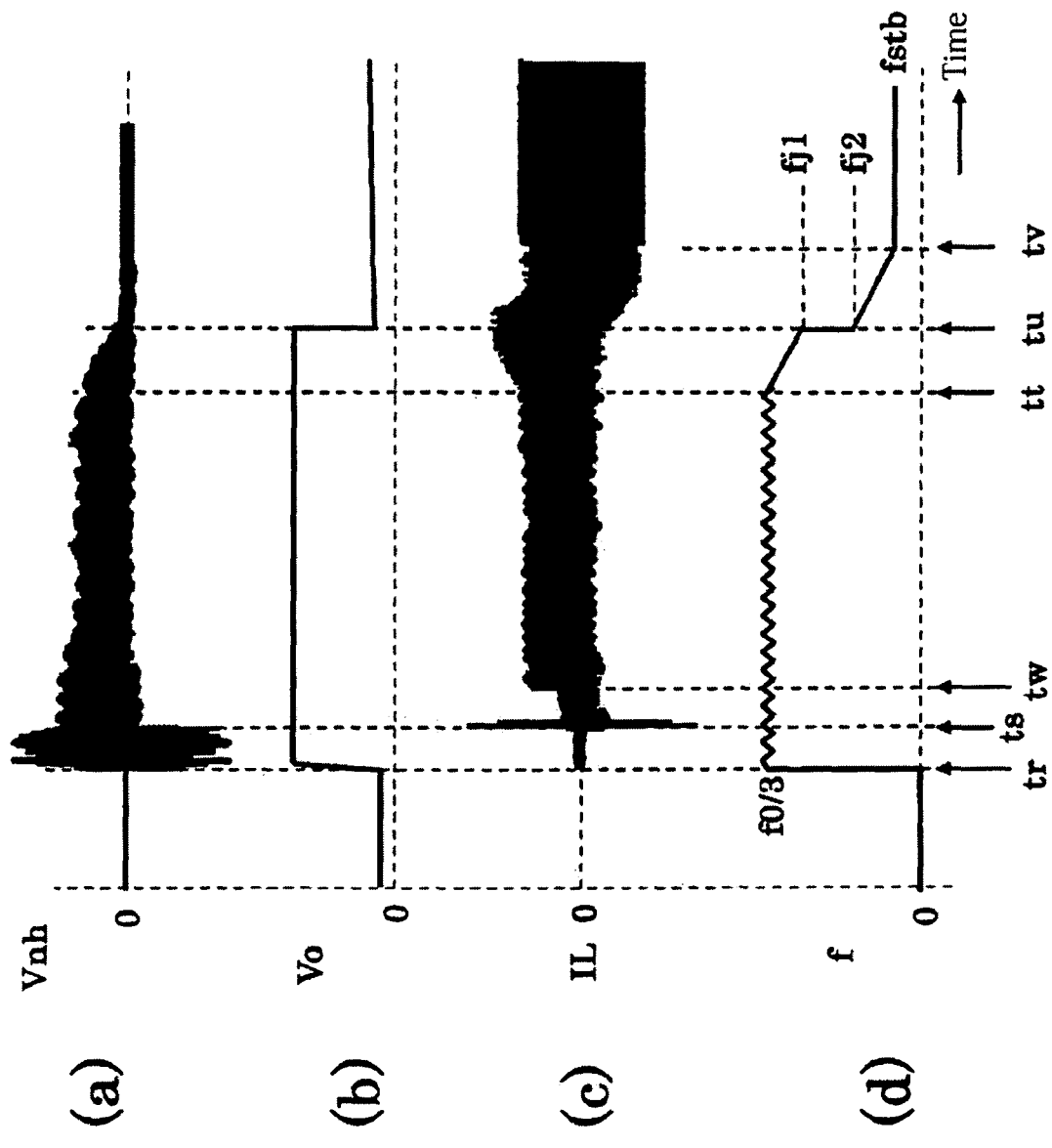
FIG. 14 is a simplified timing diagram of an embodiment of a discharge lamp lighting apparatus according to the present invention.

FIG. 14 is a simplified timing diagram of an embodiment of a discharge lamp lighting apparatus according to the present invention. Description of the embodiment will be given below, referring to FIG. 14. In the figure, (a) is a waveform of voltage (Vnh) generated in the resonant circuit (Nh), (b) is a waveform of output voltage (Vo) of the power supply circuit, (c) is a waveform of the lamp current (IL), and (d) is a situation of change of frequency (f) of the inverter (Ui). When it is regarded that an optimum frequency detection sequence has already completed, a starting sequence of the discharge lamp (Ld) is started at a time point (tr). Since it is driven at the optimal frequency of the inverter (Ui) corresponding to the frequency control signal (Sf), the output voltage (Vnh) becomes high promptly. It is viewed that, at a time point (ts), a breakdown occurs in the discharge lamp (Ld) so that the lamp current (IL) begin to flow. However, during a period following therefrom, as understood from the waveform of the lamp current (IL) shown in the figure, which deviates for a while toward the positive side, a state of asymmetrical electric discharge occurs. On the other hand, as understood from the waveform of the electric supply voltage detection signal (Sv), the power supply circuit (Ux) constantly outputs non-load open circuit voltage (Vop) from the beginning of a starting sequence, so as to supply it to the inverter (Ui).

As described above, much lamp current flows by starting a sequence including a step of gradually reducing the driving frequency of the inverter (Ui) from a high frequency wave at resonance start-up time, so as to ultimately shift it low frequency, whereby the heating of electrodes is facilitated. As understood from FIG. 14, the waveform of the lamp current (IL) shifts from the state of deviating toward the positive side in the waveform of the lamp current (IL), to a state where the balance of positive/negative components is gradually improved. Thus, a state of asymmetrical electric discharge is gradually eliminated.

And at a time point (tu), at which the frequency of the inverter (Ui) is decreased to the a first threshold frequency (fj1), while the state (voltage control mode) where the non-load open circuit voltage (Vop) is controlled to be outputted, is ended and the control mode of the power supply circuit (Ux) is changed so as to, for example, shift to a state (current control mode) in which control is performed so that the electric supply current detection signal (Si) becomes a target value, the frequency of the inverter (Ui) is controlled so as to be decreased rapidly to a second threshold frequency (fj2). The "state (current control mode) for performing control so that the electric supply current detection signal (Si) becomes a target value", means the operation which is described in the above explanation in which when the lamp is started so that discharge current flows, the electric supply control circuit (Fx) generates the gate driving signal (Sg) in a feedback manner so that the target lamp current may be outputted.

Since the frequency of the inverter (Ui) becomes low by performing the control in this way, the impedance of the resonance inductor (Lh) is sufficiently low, and the voltage of the power supply circuit (Ux) becomes approximately equal to the lamp voltage of the discharge lamp (Ld). Therefore, high voltage like the non-load open circuit voltage becomes unnecessary for the output voltage of the power supply circuit (Ux). In this way, in a state where the frequency of the inverter (Ui) becomes sufficiently low and the output voltage of the power supply circuit (Ux) becomes sufficiently low level which is approximately the arc discharge voltage of the discharge lamp (Ld), since unlike (a) of FIG. 13, there is not a rapid change or a peak of the lamp current (IL)t, the lamp current (IL) can be correctly controlled by control of the electric supply current detection signal (Si). As a result, the generation of the excessive current of the lamp current (IL), which attributes to the excessive saturation limiting current value (Ih) of the resonance inductor (Lh), can be avoided.

In addition, since, at the time point (tu), the frequency of the inverter (Ui) and the control mode of the power supply circuit (Ux) are simultaneously switched, rush current may flow through the discharge lamp (Ld) at the time point (tu), depending on tolerance in delicate switch timing (jitter). Since the length of the period of an ON state of the switching element (Qx) may be restricted by using pulse by pulse control technology, or the appearance of the time point (tu) may be controlled by the discharge lamp lighting apparatus itself, the phenomenon in which the rush current flows can be avoided by a measure of, for example, setting a target value of output voltage or output current of the power supply circuit (Ux) to a level lower than expected, immediately before the time point (tu), or restricting the length of the period of the ON state of the switching element (Qx).

Since the saturation phenomenon is a nonlinear phenomenon, as described above, exact time until the resonance inductor (Lh) begins to be saturated in a state where non-load open circuit voltage is applied, can not be calculated simply from speed obtained by dividing the voltage applied to the resonance inductor (Lh) by the inductance value of the inductor. Therefore, it is desirable to experimentally set up the first threshold frequency (fj1), taking into consideration variation of the saturation limiting current value (Ih) of the resonance inductor (Lh). FIG. 14, shows a case where at the time point (tu) when the frequency of the inverter (Ui) is decreased to the first threshold frequency (fj1), the frequency of the inverter (Ui) is controlled so as to be promptly reduced to the second threshold frequency (fj2). However, certainty of eliminating the state of asymmetrical electric discharge can be increased by performing control so that a certain waiting period is provided in the state of the first threshold frequency (fj1) before the frequency of the inverter (Ui) is reduced to the second threshold frequency (fj2), since time until the electrodes (E1, E2) of the lamp are thermally balanced is required in order to remove a state of asymmetrical electric discharge.

In addition, the reason for gradually shifting to the stable lighting frequency (fstb) after shifting to the second threshold frequency (fj2) once, but not directly shifting from the frequency of the inverter (Ui) to the first threshold frequency (fj1) to the stable lighting frequency (fstb), is that in a case where the state of asymmetrical electric discharge has not been eliminated at a time when the frequency of the inverter (Ui) is rapidly reduced from the first threshold frequency (fj1), elimination of the state of asymmetrical electric discharge is completed, before completion of shifting to the stable lighting frequency (fstb), after shifting to the second threshold frequency (fj2).

Figure 16:
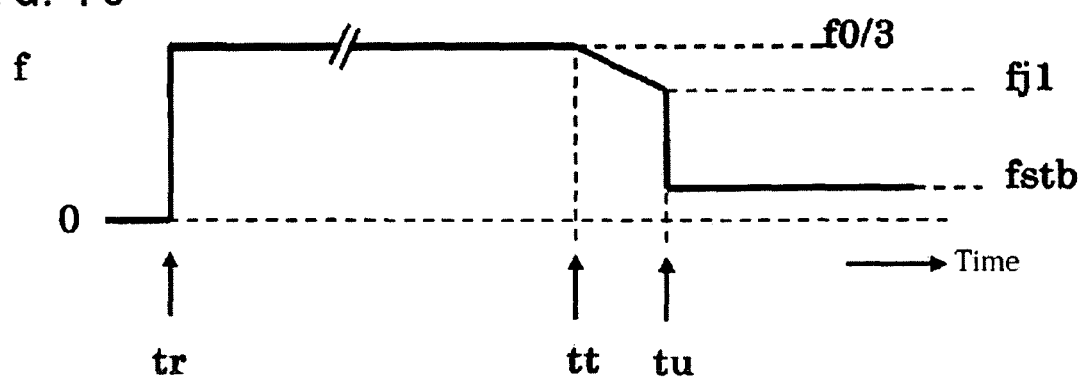
FIG. 16 is a simplified timing diagram of an embodiment of a discharge lamp lighting apparatus according to the present invention.

Therefore, as described above, control is performed to wait for a certain period in the state of the first threshold frequency (fj1) before reducing the frequency of the inverter (Ui) to the second threshold frequency (fj2). In such a case, or even though not in such a case, for example, in a case where heat capacity thereof is designed so as to be small, so as to easily attain the thermal balance of the electrodes (E1, E2) of the lamp, that is, so that the temperature thereof may tend to rise, if the elimination of the state of asymmetrical electric discharge has been completed at time when the frequency of the inverter (Ui) is rapidly reduced from the first threshold frequency (fj1), the frequency of the inverter (Ui) may be controlled so as to be directly shifted from the first threshold frequency (fj1) to the stable lighting frequency (fstb) (transfer time is zero). FIG. 16 is a simplified timing diagram of an embodiment of a discharge lamp lighting apparatus according to the present invention, wherein a situation of frequency control of the inverter (Ui) is shown.

As described above, a temperature rise of the electrodes (E1, E2) due to heating by electric discharge in the discharge lamp (Ld) is important and depends on the electric power applied to the lamp and the heat capacity of the electrodes. As is obvious from the above description, the electric power applied to the lamp is determined by not only the impedance of the resonance inductor (Lh), whose parameter is the frequency of the inverter (Ui), but also the output voltage of the power supply circuit (Ux). Therefore, since the optimum value of the length of the transition period from a time point (tt) to the time point (tu) depends on the output voltage of the power supply circuit (Ux) and the heat capacity of the electrodes (E1, E2) in this transition period, it is necessary to experimentally acquire it. It is also necessary to experimentally acquire the optimum value of the length of the transition period from the time point (tu) to a time point (tv), even including a case where the transition period is zero, in a similar manner. In addition, although FIG. 14 shows that a frequency reducing speed at time of shifting from the second threshold frequency (fj2) to the low frequency which is in a final stable lighting state, i.e., stable lighting frequency (fstb), is the same as the frequency reducing speed from the time point (tt), these frequency reducing speeds (inclination of the electric supply voltage detection signal (Sv)) may be different from each other.

Incidentally, as a method of setting up of the time point (tt) which is a starting point of a sequence in which the driving frequency of the inverter (Ui) is gradually reduced from the high frequency wave at resonance start-up time, in the simplest case, for example, it may be set up to a time point at which a predetermined period lapses from a time point (tr) which is a starting point of the starting sequence. Or, it may be set up to a time point at which a predetermined time lapses from a time point (ts) when a breakdown arises in the discharge lamp (Ld), and the lamp current (IL) began to flow. Furthermore, it may be set up to a time point at which a predetermined time (including zero) lapses from a time point (tw) when the lamp current (IL) begins to flow, and a current value increases to a value equivalent to arc discharge. In addition, it is possible to detect that the current begins to flow through the discharge lamp (Ld), and that the current value increases to the value equivalent to arc discharge, by monitoring the electric supply current detection signal (Si) from the electric supply current detection unit (Ix) and, detecting whether it exceeds the predetermined value.

Figure 15:
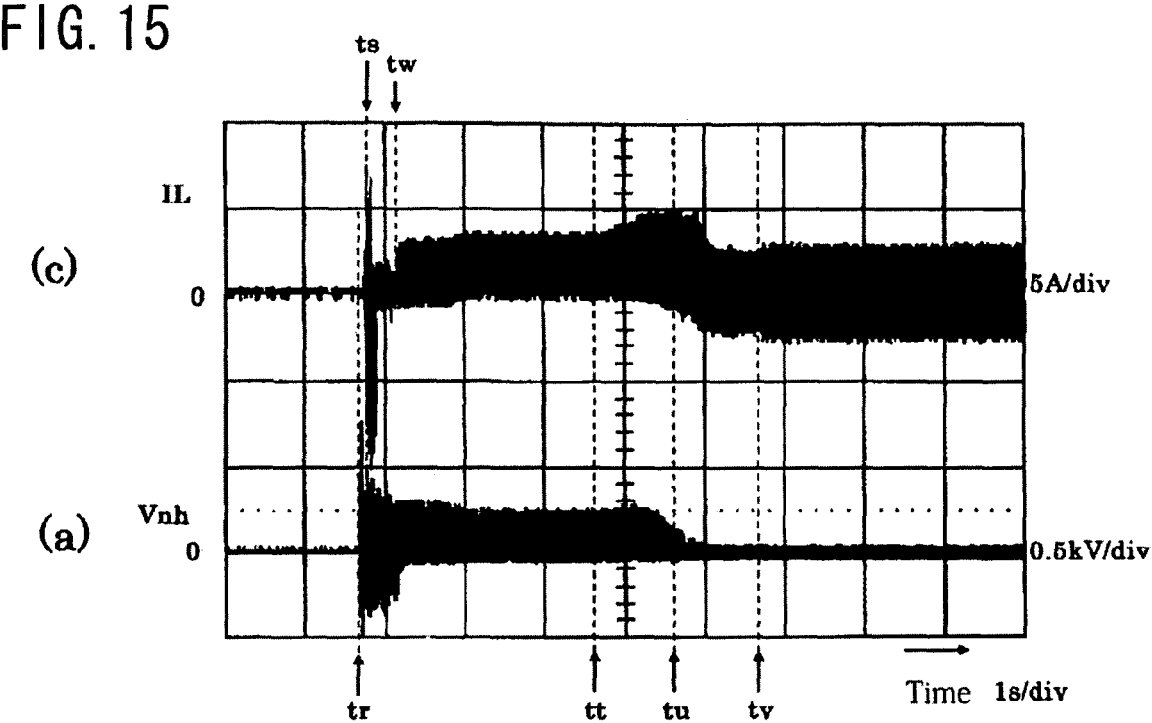
FIG. 15 is a diagram of waveform measured in an embodiment of a discharge lamp lighting apparatus according to the present invention.

FIG. 15 shows actually measured waveforms, which correspond to the waveforms (a) and (c) of FIG. 14 which is a simplified timing diagram of an embodiment of a discharge lamp lighting apparatus according to the present invention. In the figure, (a) shows a waveform of voltage (Vnh) generated in the resonant circuit (Nh), (c) shows a waveform of the lamp current (IL), wherein time points shown in the figure (tr, ts, tt, tu, tv, and tw) correspond to the time points (tr, ts, tt, tu, tv, tw) shown in FIG. 14, respectively. In fact, the waveforms (a) and (c) of FIG. 14 are drawn by tracing the waveforms (a) and (c) of FIG. 15. However, in the actually measured waveforms of FIG. 15, the time point (ts), at which a breakdown occurs in the discharge lamp (Ld), is too close to the time point (tr), at which the starting sequence is started and high voltage starts to be applied to the discharge lamp (Ld) by resonance. Therefore, for convenience of explanation, in FIG. 14, a time interval between the time point (tr) and the time point (ts), is changed and drawn so as to be longer than in reality. In the figure, a time interval between the time point (ts) and the time point (tw) is drawn in the same way.

Concrete numerical parameters in an embodiment of a discharge lamp lighting apparatus according to the present invention, which was actually measured as shown in FIG. 15, are described below. A lamp was a high pressure mercury discharge lamp with rated power of 200 W. Non-load open discharge voltage (Vop) was 200 V. Resonance frequency was approximately 100 kHz (third resonance). First threshold frequency (fj1) was 40 kHz. Second threshold frequency (fj2) is 8 kHz. Stable lighting frequency (fstb) was 370 Hz. A waiting period from a start of a starting sequence, to a start of a sequence in which frequency was gradually decreased (from the time point (tr) to the time point (tt)) was approximately 3 seconds. A transition period from resonance frequency to a first threshold frequency (the time period (tt) to the time period (tu)), was approximately 1 second. A transition period from a second threshold frequency to stable lighting frequency (from the time point (tu) to the time point (tv)) was approximately 1 second. In addition, in the discharge lamp used for this survey experiment, as a transition period from resonance frequency to the 1st threshold frequency, although the conditions from 0.2 seconds to 3 seconds were tried, the good result was obtained within the limits of this.

The parameters, etc., with regards to the embodiments of the present invention, which are described in relation to FIG. 15, are applied to a high pressure mercury lamp in which a pair of electrodes, each having a projection(s) at a tip thereof, is arranged so as to face each other at an interval of 2.0 mm or less, mercury of 0.2 mg/mm$^3$ or more, and halogen in a range of $1 \times 10^{-6}$ μmol to $1 \times 10^{-2}$ μmol is enclosed. As shown in the actually measured waveforms of FIG. 15, and described in relation to FIG. 14, much lamp current flows by starting, at the time point (tt), a sequence including a step of gradually reducing the driving frequency of the inverter (Ui) from a high frequency wave at resonance start-up time so as to ultimately shift it low frequency, whereby the heating of electrodes is facilitated. Thus, since the waveform of the lamp current (IL) gradually shifts from the state of deviating toward the positive side in the waveform of the lamp current (IL), to a state where the balance of positive/negative components is gradually improved, it is possible to confirm that there is an advantage that elimination of a state of asymmetrical electric discharge is facilitated.

As described above, the phenomenon in which the lamp current (IL) exceeds the saturation limiting current value (Ih) of the resonance inductor (Lh), occur when the driving frequency of the inverter (Ui) decreases exceeding a limit thereof. The saturation limiting current value (Ih) depends on the physical properties, the shape, and the volume of core material which forms the resonance inductor (Lh). Therefore, for example, when there is a value which should be set up as first threshold frequency (fj1) in order to realize a good lamp life span, there is a problem in which core material which can realize the value has to be selected, thereby imposing big restrictions in saving the cost or reducing the size and weight of the discharge lamp lighting apparatus.

In order to avoid this problem, while the periodic driving circuit (Uj) generates the inverter driving signal (Sj) in order that the frequency of the inverter (Ui), which corresponds to the resonance frequency of the resonant circuit (Nh), gradually decreases so as to reach the first threshold frequency (fj1), the electric supply control circuit (Fx) performs control so that the power supply circuit (Ux) outputs voltage which decreases gradually until it reaches predetermined voltage (Vo2) lower than the non-load open circuit voltage (Vop). This is because, as described above, although the former half cycle period increases with progress of time by performing such control, since the peak value of the current of the resonance inductor (Lh) is proportional to not only a half cycle period of the inverter (Ui) but also output voltage of the power supply circuit (Ux), since the output voltage of the latter power supply circuit is controlled so as to decrease, the increasing speed in the peak value of the current of the resonance inductor (Lh) becomes slower than that in the case where the output voltage of the power supply circuit is fixed.

The situation thereof is shown in FIG. 17, which is a simplified timing diagram of an embodiment of a discharge lamp lighting apparatus according to the present invention. In the figure, (a) shows a waveform of output voltage (Vo) of the power supply circuit, and (b) shows a situation of change of the driving frequency (f) of the inverter (Ui). In this case, since the output voltage of the power supply circuit (Ux) and the driving frequency of the inverter (Ui) are controlled, the conditions at the start time of the sequence, by which the driving frequency of the inverter (Ui) is gradually reduced from the high frequency wave at the resonance start-up at the time point (tt), that is, the non-load open circuit voltage (Vop) and the frequency of the inverter (Ui), are the same. That is, although the non-load open circuit voltage (Vop) and the frequency of the inverter (Ui) are completely the same as those in the case which is explained in relation to the FIG. 14, it becomes possible to set up lower first threshold frequency (fj1), without the phenomenon in which it exceeds the saturation limiting current value (Ih).

In addition, FIG. 17 shows the case where the decrease start timing of the frequency of the inverter (Ui) and that of the output voltage of the power supply circuit (Ux) are the same. For example, it is possible to perform control so that the decrease start timing of the output voltage of the power supply circuit (Ux) may be delayed, or for example, it is possible to perform control so as to stop the decrease of the output voltage of the power supply circuit (Ux) during the decrease of the frequency of the inverter (Ui).

As stated above, according to the embodiments of the present invention, when the driving frequency of the inverter (Ui) is shifted from the high frequency wave of the resonance start-up time, to low frequency at the time of stable lighting of the final discharge lamp (Ld), since the maximum current value of the lamp current (IL) can be gradually increased by continuously reducing the driving frequency of the inverter (Ui) toward low frequency without rapid shifting, heating of one of the electrodes in which arc discharge does not occur in a cycle of a cathode, is facilitated so as to start thermionic emission, whereby a state of asymmetrical electric discharge can be eliminated, and therefore light-out of the lamp can be prevented.

At that time, in order that the lamp current (IL) may not exceed the saturation limiting current value (Ih) of the resonance inductor (Lh), when the frequency of the inverter (Ui) is decreased to the a first threshold frequency (fj1), while the state (voltage control mode) where the non-load open circuit voltage (Vop) has been controlled to be outputted, is ended, and the control mode of the power supply circuit (Ux) is changed, for example, so as to shift to a state (current control mode) in which control is performed so that the electric supply current detection signal (Si) becomes a target value, the frequency of the inverter (Ui) is controlled so as to be decreased rapidly to the second threshold frequency (fj2), which is sufficiently low frequency to the extent which the power supply circuit (Ux) can correctly control the lamp current (IL), whereby, it is possible to prevent excessive peak current from flowing therethough, thereby preventing damages to the switching elements (Qx, Q1, Q2, Q3, and Q4), the discharge lamp (Ld), the power supply circuit (Ux), and the inverter (Ui).

A circuit configuration given in the specification is described at minimum in order to explain the operations, functions and actions of the discharge lamp lighting apparatus according to the present invention, and an action. Therefore, it is premised that the detailed circuit configuration described above, for example, determinations of the polarity of signals, or originality and creativity, such as selections, additions, or omissions of concrete circuit elements, convenience of procurements of elements, or changes based on economic reasons, are carried out at the time of the design of actual apparatus.

In the actual structure of a discharge lamp lighting apparatus, it is not necessarily to separately or independently provide respective functional blocks, such as the electric supply control circuit (Fx), the frequency control circuit (Uf), and/or the periodic driving circuit (Uj), and, for example, some of these functional blocks may be realized by software-based functions in a microprocessor or a digital signal processor. In that case, signals, such as the synchronization degree signal (Sn) and the frequency control signal (Sf), may be realized as a value or a variable of a digital signal in a microprocessor or a digital signal processor, so that they areal not exist as an analog-voltage signal or an analog current signal. Such structure is also one of the embodiments of the present invention.

Moreover, the formation conditions of the frequency control signal (Sf), or the frequency control signal (Sf) which is a digital signal or a value of a variable, etc., may be recorded in a nonvolatile memory using a FLASH memory, etc., or a memory of an optical apparatus, such as a projector having a communication unit with the discharge lamp lighting apparatus. Or, when expiration date of such a memory is provided and if it exceeds the expiration date, the content of the memory may be cleared and then obtained again. Thus, improvement of functions and performance thereof can be realized within freedom of design of a discharge lamp lighting apparatus. It is premised that the mechanism for especially protecting circuit elements, such as switching elements (for example, an FET), from breakage factors, such as an overvoltage, and overcurrent, or overheating, or the mechanism for reducing a radiation noise or a conduction noise, generated with an operation of the circuit element of the power supply apparatus or preventing the generated noise from releasing to the outside, for example, a snubber circuit, and a varistor, a clamp diode, a current restriction circuit (including a pulse by pulse system), a noise filter choke coil of a common mode, or normal mode, a noise filter capacitor, etc., are added to each part of the circuit configuration shown in the embodiments if needed. The structure of the discharge lamp lighting apparatus according to the present invention is not limited to the circuit system disclosed in this specification. As to industrial application, the present invention relates to improvements of a discharge lamp lighting apparatus for lighting a high pressure discharge lamp. For example, the present invention may be used in a high intensity discharge lamp such as an optical apparatus for an image display such as a projector.

The preceding description has been presented only to illustrate and describe exemplary embodiments of the present discharge lamp lighting apparatus. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A discharge lamp lighting apparatus for lighting a discharge lamp (Ld) in which a pair of electrodes (E1, E2) for main discharge are arranged so as to face each other, the discharge lamp lighting apparatus comprising:

a power supply circuit (Ux) that supplies electric power to the discharge lamp (Ld), an inverter (Ui) that is provided in a downstream side of the power supply circuit (Ux) and that performs polarity reversals of voltage applied to the discharge lamp (Ld);

a periodic driving circuit (Uj) that generates an inverter driving signal (Sj) that is a periodic signal for carrying out periodic driving of the inverter (Ui);

a frequency control circuit (Uf) that generates a frequency control signal (Sf) for controlling frequency of the periodic driving circuit (Uj);

a resonant circuit (Nh), which is made up of a resonance inductor (Lh) and a resonant capacitor (Ch), which is arranged in a downstream side of the inverter (Ui), and which boosts voltage supplied to the discharge lamp (Ld) at start-up time of the discharge lamp (Ld), by a boosting action accompanying a resonance phenomenon; and a synchronization degree detection unit (Un) that generates a synchronization degree signal (Sn) corresponding to a difference between frequency of the periodic driving circuit (Uj), and resonance frequency of the resonant circuit (Nh), wherein in an optimum frequency detection sequence of the discharge lamp (Ld), the frequency control circuit (Uf) performs a sweep operation in which, while the frequency control circuit (Uf) monitors the synchronization degree signal, the frequency control signal (Sf) is changed, so that frequency is changed, starting from either an upper limit frequency or a lower limit frequency of the periodic driving circuit (Uj), in a range that does not exceed the other frequency, wherein after completion of the sweep operation, the frequency control circuit (Uf) determines a value of the frequency control signal (Sf) corresponding to the resonance frequency of the resonant circuit (Nh), and inputs the value into a frequency driving circuit (Uj), wherein at least in a period of the sweep operation, the inverter (Ui) receives power supply from a sweep time power supply circuit (Uy) for supplying electric power with constant supply capability, which is limited to a range in which breakdown does not occur in the discharge lamp (Ld), and wherein the synchronization degree signal (Sn) corresponds to output voltage of the sweep time power supply circuit (Uy).

2. The discharge lamp lighting apparatus according to claim 1, wherein the sweep time power supply circuit (Uy) supplies output voltage from a constant voltage power supply (Up) through a resistor (Rr).

3. The discharge lamp lighting apparatus according to claim 1, wherein in a period of the sweep operation, the power supply circuit (Ux) performs an operation with the constant supply capability, so that the power supply circuit (Ux) serves as the sweep time power supply circuit (Uy).

* * * * *